(12) United States Patent
Komatsu et al.

(10) Patent No.: US 6,747,831 B2
(45) Date of Patent: Jun. 8, 2004

(54) FLOPPY DISK DRIVE AND FRAME STRUCTURE THEREFOR

(75) Inventors: Hisateru Komatsu, Tendo (JP); Mamoru Takahashi, Murayama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 542 days.

(21) Appl. No.: 09/739,462

(22) Filed: Dec. 18, 2000

(65) Prior Publication Data

US 2001/0005293 A1 Jun. 28, 2001

(30) Foreign Application Priority Data

Dec. 22, 1999 (JP) .......................... 11-363748

(51) Int. Cl.[7] .................. G11B 15/18; G11B 17/00; G11B 19/02
(52) U.S. Cl. .................. 360/71; 360/99.01; 360/99.04; 360/99.08; 360/99.11
(58) Field of Search ................. 360/71, 99.01, 360/99.04, 99.08, 99.11; 318/268, 254

(56) References Cited

U.S. PATENT DOCUMENTS 4,882,511 A    11/1989  von der Heide 5,254,895 A  * 10/1993  Koizumi ................ 310/156.06
5,299,277 A  *  3/1994  Fujii ......................... 388/815
5,998,947 A  * 12/1999  Shimizu et al. ............. 318/268
6,111,372 A  *  8/2000  Nishimura ................. 318/254

FOREIGN PATENT DOCUMENTS

JP    9-91859    4/1997
JP    9-97493    4/1997
JP    9-97839    4/1997

* cited by examiner

Primary Examiner—David Hudspeth
Assistant Examiner—Jason Olson
(74) Attorney, Agent, or Firm—Frishauf, Holtz, Goodman & Chick, P.C.

(57) ABSTRACT

In a floppy disk drive having a main frame in which a floppy disk is inserted and a DD motor for rotatably driving the floppy disk inserted in the main frame, the floppy disk drive has a motor frame for mounting the DD motor thereon that is constituted by one piece integrated by the main frame. Preferably, the motor frame part may have a drawn-shape obtained by drawing the main frame. In addition, the floppy disk drive has an electronic processing arrangement for a frequency generation pattern. The electronic processing arrangement gives play to a function equivalent to the frequency generation pattern required to control the DD motor.

2 Claims, 17 Drawing Sheets

FLOPPY DISK DRIVE AND FRAME STRUCTURE THEREFOR

BACKGROUND OF THE INVENTION

This invention relates to a flexible or floppy disk drive (which may be hereinafter called "FDD" for short) and, in particular, to a frame structure therefor.

In the manner which is well known in the art, the floppy disk drive of the type is a device for carrying out data recording and reproducing operation to and from a disk-shaped magnetic recording medium of a floppy disk (which may be hereinafter called "FD" for short) loaded therein. In addition, such a floppy disk drive is mounted or loaded in a portable electronic equipment such as a laptop personal computer, a notebook-size personal computer, a notebook-size word processor, or the like.

The floppy disk drive of the type comprises a magnetic head for reading/writing data from/to the magnetic recording medium of the floppy disk, a carriage assembly for supporting the magnetic head at a tip thereof with the magnetic head movably along a predetermined radial direction to the floppy disk, a stepping motor for moving the carriage assembly along the predetermined radial direction, and a spindle motor for rotatably driving the magnetic recording medium with the floppy disk held. The spindle motor is one of direct-drive (DD) motors.

In order to control such a floppy disk drive, an FDD control apparatus is already proposed. By way of example, Japanese Unexamined Patent Publication Tokkai No. Hei 9-97,493 or JP-A 9-97493 discloses, as the FDD control apparatus, one integrated circuit (IC) chip which incorporates first through third control circuits therein. The first control circuit is a reading/writing (hereinafter called "R/W") control circuit for controlling reading/writing of data. The second control circuit is a stepping motor (hereinafter called "STP") control circuit for controlling drive of the stepping motor. The third control circuit is a general controlling (hereinafter called "CTL") control circuit for controlling whole operation of the flexible disk drive. The CTL control circuit may be called a logic circuit. This IC chip is generally implemented by a metal oxide semiconductor (MOS) IC chip where a number of MOS field effect transistors (FETs) are integrated therein.

The FDD control apparatus comprises not only the one IC chip but also a spindle motor IC chip for controlling drive of the spindle motor. The spindle motor IC chip is implemented by a bipolar IC chip where a number of bipolar transistors are integrated therein.

Now, floppy disk drives have different specifications due to customers or users. The specification defines, for example, drive select 0 or 1, the presence or absence of a special seek function, the presence or absence of an automatic chucking function, a difference of logic for a density out signal, a difference of logic for a mode select signal, 1M mode 250 kbps or 300 kbps, and so on. If development is made of one IC chips which individually satisfy the different specification, a number types of one IC chips must be prepared. In order to avoid this, a one IC chip having a selectable function circuit is already proposed, for example, in Japanese Unexamined Patent Publication Tokkai No. Hei 9-97,839 or JP-A 9-97839 wherein all functions satisfying all specifications are preliminarily incorporated therein and one of the functions is selected in accordance with a particular specification.

In the manner which is well known in the art, the floppy disk driven by the floppy disk drive includes a disk-shaped magnetic recording medium accessed by the magnetic head. The magnetic recording medium has a plurality of tracks on a surface thereof that serve as paths for recording data and that are formed in a concentric circle along a radial direction. The floppy disk has eighty tracks on one side which include the most outer circumference track (which is named "TR00") and the most inner circumference track (which is named "TR79"). The most outer circumference track TR00 is herein called the most end track.

It is necessary to position the magnetic head at a desired track position in a case where the floppy disk is accessed by the magnetic head in the floppy disk drive. For this purpose, the carriage assembly for supporting the magnetic head at the tip thereof must be positioned. Inasmuch as the stepping motor is used as a driving arrangement for driving the carriage assembly, it is possible for the floppy disk drive to easily carry out the positioning of the carriage assembly. In spite of this, it is necessary for the floppy disk drive to detect only the position of the most end track TR00 in the magnetic recording medium of the floppy disk loaded therein. In order to detect the position of the most end track TR00, the carriage assembly is provided with an interception plate which projects from a base section thereof downwards and a photointerrupter is mounted on a substrate in the vicinity of a main frame opposed to the carriage assembly. For example, see Japanese Unexamined Patent Publication Tokkai No. Hei 9-91,859 or JP-A 9-91859. That is, it is possible to detect that the magnetic head is laid in the position of the most end track TR00 in the magnetic recording medium of the floppy disk because the interception plate intercepts an optical path in the photointerrupter. Such a track position detecting mechanism is called a "00 sensor" in the art.

In prior art, a magnetic sensor (rotor position detector) is used in order to control the spindle motor and Hall elements are generally used as detecting elements for use in the magnetic sensor. In other words, a conventional magnetic sensor comprises a plurality of Hall elements. The spindle motor using such as Hall elements is called a "Hall motor." In the manner which is known in the art, the "Hall element" is a semiconductor element applying a "Hall effect" which is a phenomenon where an electromotive force occurs in a direction perpendicular to each of a current and a magnetic field when the magnetic field is applied to the current flowing a conductor in a direction perpendicular to a direction of the current. A voltage generated by each Hall element is called a Hall voltage. That is, the Hall element is an element for converting strength of a magnetic field into a voltage.

In the manner which will later be described in conjunction with FIGS. 7 through 9, a conventional floppy disk drive comprise not only a main frame but also a motor frame for mounting the DD motor (spindle motor) thereon. In other words, the motor frame is constituted as another piece different from the main frame. In addition, the main frame is also called a main chassis while the motor frame is also called a motor base. Accordingly, the conventional floppy disk drive is disadvantageous in that it requires a lot of parts and the number of processes for assembling increases. In addition, the conventional floppy disk drive is also disadvantageous in that a characteristic of the spindle motor (DD motor) is dispersed on mounting the motor frame on the main frame and it is therefore difficult to stabilize the spindle motor.

SUMMARY OF THE INVENTION

It is therefore an object of the present invention to provide a floppy disk drive which is capable of reducing the number of parts.

It is another object of the present invention to provide a floppy disk drive of the type described, which is capable of decreasing the number of processes for assembling.

It is still another object of the present invention to provide a floppy disk drive of the type described, which is capable of suppressing dispersion in a characteristic of a spindle motor mounted therein to stabilize the spindle motor.

Other objects of this invention will become clear as the description proceeds.

On describing the gist of an aspect of this invention, it is possible to be understood that a floppy disk drive comprises a main frame in which a floppy disk is inserted and a motor for rotatably driving the floppy disk inserted in the main frame. According to the aspect of this invention, the above-understood floppy disk drive comprises a motor frame part for mounting the motor thereon that is constituted by one piece integrated by the main frame.

On describing the gist of another aspect of this invention, it is possible to be understood that a frame structure is for use in a floppy disk drive for driving a floppy disk inserted therein. According to the other aspect of this invention, the above-understood frame structure comprises a main frame in which the floppy disk is inserted and a motor frame part for mounting a motor for rotatably driving the floppy disk inserted in the main frame. The main frame and the motor frame part constitute one piece in which the main frame and the motor frame part are integrated.

In the above-mentioned floppy disk drive or in the above-mentioned frame structure, the motor frame part may have a drawn-shape obtained by drawing the main frame. In the above-mentioned floppy disk drive comprises an electronic processing arrangement for a frequency generation pattern. The electronic processing arrangement gives play to a function equivalent to the frequency generation pattern required to control the motor.

DESCRIPTION OF THE PREFERRED EMBODIMENT

Figure 1:
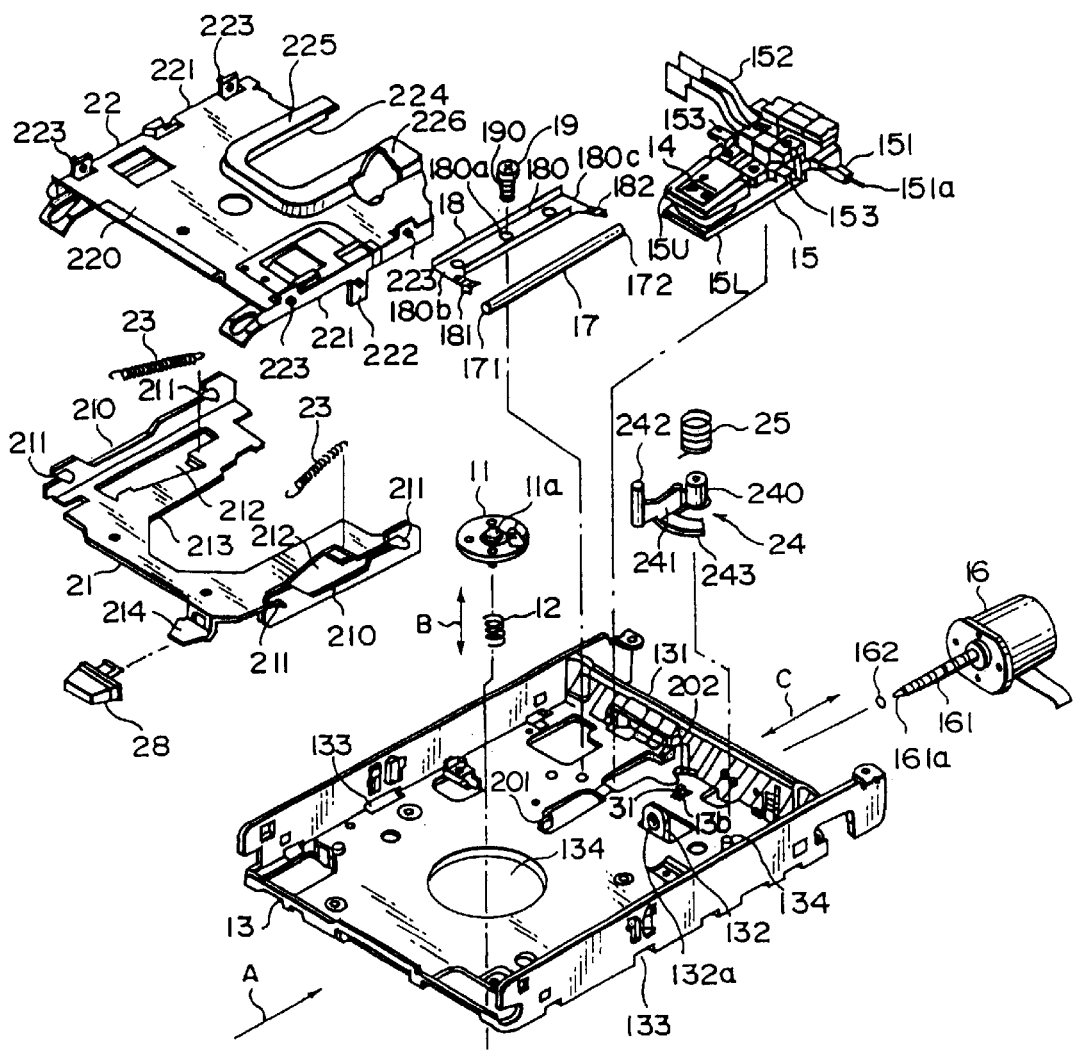
FIG. 1 is an exploded perspective view showing a main part of a conventional floppy disk drive.
Figure 2:
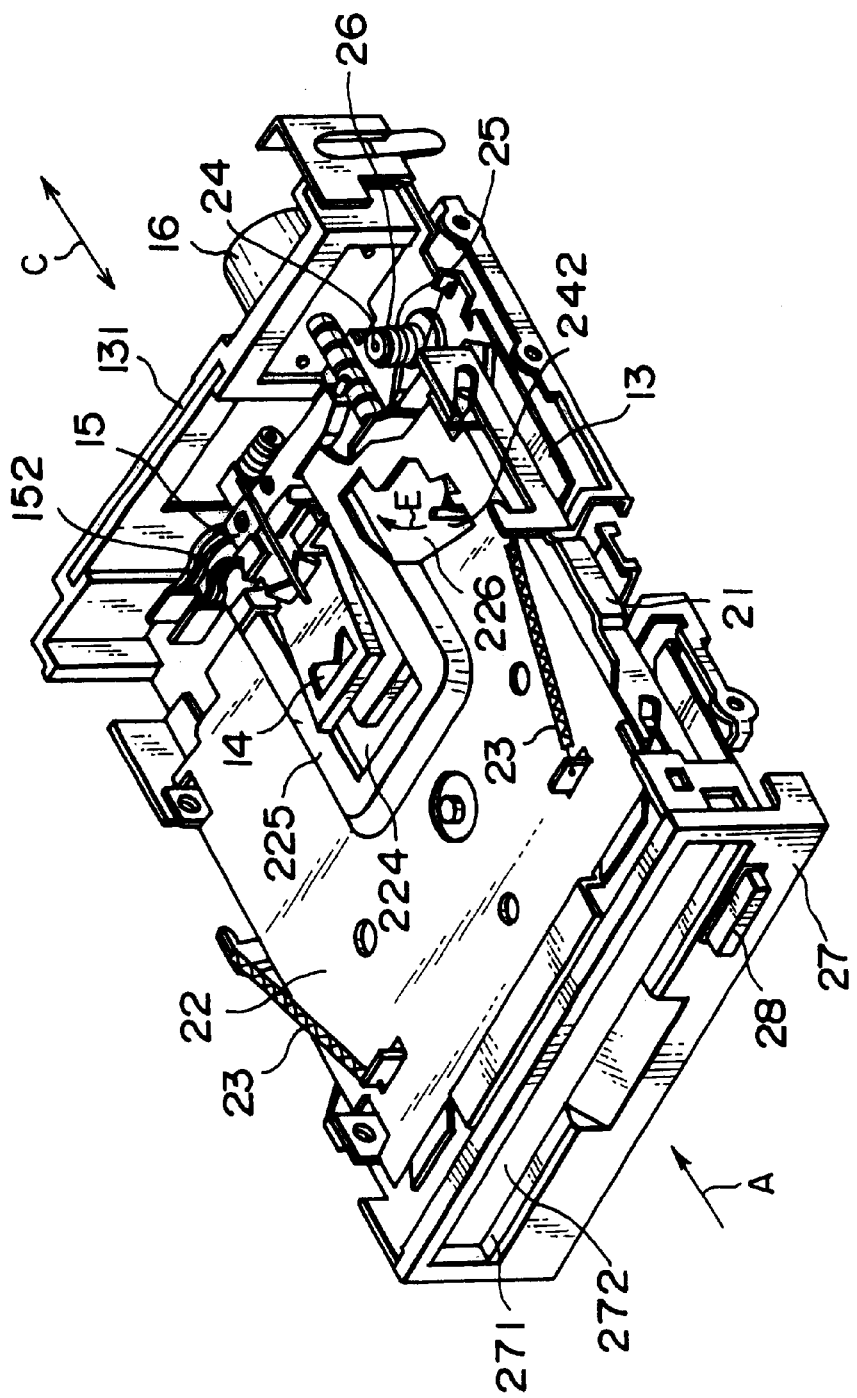
FIG. 2 is a schematic perspective view of the floppy disk drive illustrated in FIG. 1 as view from front obliquely.

Referring to FIGS. 1 and 2, a conventional floppy disk drive of a 3.5-inch type will be described at first in order to facilitate an understanding of the present invention. FIG. 1 is an exploded perspective view of the conventional floppy disk drive and FIG. 2 is a perspective view of the conventional floppy disk drive viewing from a front side.

The illustrated floppy disk drive is a device for driving a floppy disk of a 3.5-inch type (which will later be described). The floppy disk is loaded in the floppy disk drive from a direction indicated by an arrow A in FIGS. 1 and 2. The loaded floppy disk is held on a disk table 11 having a rotation axis 11a. In this event, the rotation axis 11a coincides with a center axis of the floppy disk. In the manner which will later be described, the disk table 11 is rotatably supported on a main surface of the main frame 13. Accordingly, the rotation axis 11a of the disk table 11 has an axial direction B which extends in parallel with a thick direction of the main frame 13. The disk table 11 is rotatably driven by a spindle motor or a direct-drive (DD) motor (which will later be described), which is mounted on a back surface of the main frame 13, thereby a magnetic recording medium of the floppy disk rotates. In addition, on the back surface of the main frame 13 is attached a main printed substrate (not shown) on which a number of electronic parts (not shown) are mounted.

The floppy disk drive comprises a pair of upper and lower magnetic heads 14 (only the upper magnetic head is illustrated) for reading/writing data from/to the magnetic recording medium of the floppy disk. The magnetic heads 14 are supported in a carriage assembly 15 at a tip thereof that is laid in the floppy disk drive at a rear side. That is, the carriage assembly 15 comprises an upper carriage 15U for supporting the upper magnetic head 14 and a lower carriage 15L for supporting the lower magnetic head. The carriage assembly 15 is disposed over the main surface of the main frame 13 and is apart from the main frame 13 in the manner which will later be described. The carriage assembly 15 supports the magnetic heads 14 movably along a predetermined radial direction (i.e. a direction indicated by an arrow C in FIGS. 1 and 2) to the floppy disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the main surface of the main frame 13 by cutting and bending. By the hole 132a and the steel ball 152, a position of the driving shaft 161 is defined so as to extend in parallel with the predetermined radial direction C and the tip 161a is rotatably held.

On the other hand, the carriage assembly 15 comprises an arm 151 which extends from the lower carriage 15L to the driving shaft 161. The arm 151 has a leading edge 151a which is bent so as engage with the root in the male screw of the driving shaft 161. Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the main surface of the main frame 13. However, because support occurs by the driving shaft 161, it is difficult to dispose the whole of the carriage assembly 15 apart from the main surface of the frame 13. For this purpose, it is necessary to support and guide the carriage assembly 15 at another side thereof. To guide the carriage assembly 15 is a guide bar 17. That is, the guide bar 17 is opposed to the driving shaft 17 of the stepping motor 16 with the carriage assembly 15 inserted between the guide bar 17 and the driving shaft 161. The guide bar 17 extends in parallel with the predetermined radial direction C and has one end 171 and another end 172 which are mounted on the main surface of the main frame 13 in the manner which later be described. The guide bar 17 guides the carriage assembly 15 along the predetermined radial direction C. As a result, the whole of the carriage assembly 15 is disposed apart from the main surface of the main frame 13.

In addition, a flexible printed circuit (FPC) 152 extends from the carriage assembly 15 to the vicinity of the guide bar 17 and the flexible printed circuit 152 are electrically connected to the main printed substrate attached to the back surface of the main frame 13.

The guide bar 17 is clamped on the main surface of the main frame 13 by a guide bar clamp 18. The guide bar clamp 18 is fixed on the main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar clamp 18 merely clamps the guide bar 17, the guide bar 17 is not mounted on the main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 is used which are formed by cutting and bending parts of the main frame 13. At any rate, the pair of bent pieces 201 and 202 locates both ends 171 and 172 of the guide bar 17 to mount the guide bar 17 on the main surface of the main frame 13 in cooperation with the guide bar clamp 18.

The lower carriage 15L of the carriage assembly 15 serves as a supporting frame for supporting the carriage assembly 15 slidably along the guide bar 17. The lower carriage 15L has a projecting portion (not shown) which projects into the main surface of the main frame 13 at a side of the guide bar 17. The guide bar 17 is slidably fitted in the projection portion.

The floppy disk drive further comprises an eject plate 21 and a disk holder 22. Each of the main frame 13, the eject plate 21, and the disk holder 22 is formed to perform bending, press working, and bending of a metal plate.

The eject plate 21 is mounted on the main surface of the main frame 13 slidably along the insertion direction A of the floppy disk and an opposite direction. In the manner which will later become clear, the eject plate 21 holds, in cooperation with the disk holder 22, the flexible disk on operating of the floppy disk drive. In addition, the eject plate 21 holds the floppy disk slidably along the insertion direction A so as to allow the floppy disk drive to load the floppy disk therein along the insertion direction A and to allow the floppy disk drive to eject the floppy disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 22 and the bores 133 are formed in the main frame 13 in this example, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. In the manner which will later be described, in a state where the floppy disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counterclockwise direction on a paper of FIG. 1. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 2, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the flexible disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 3:
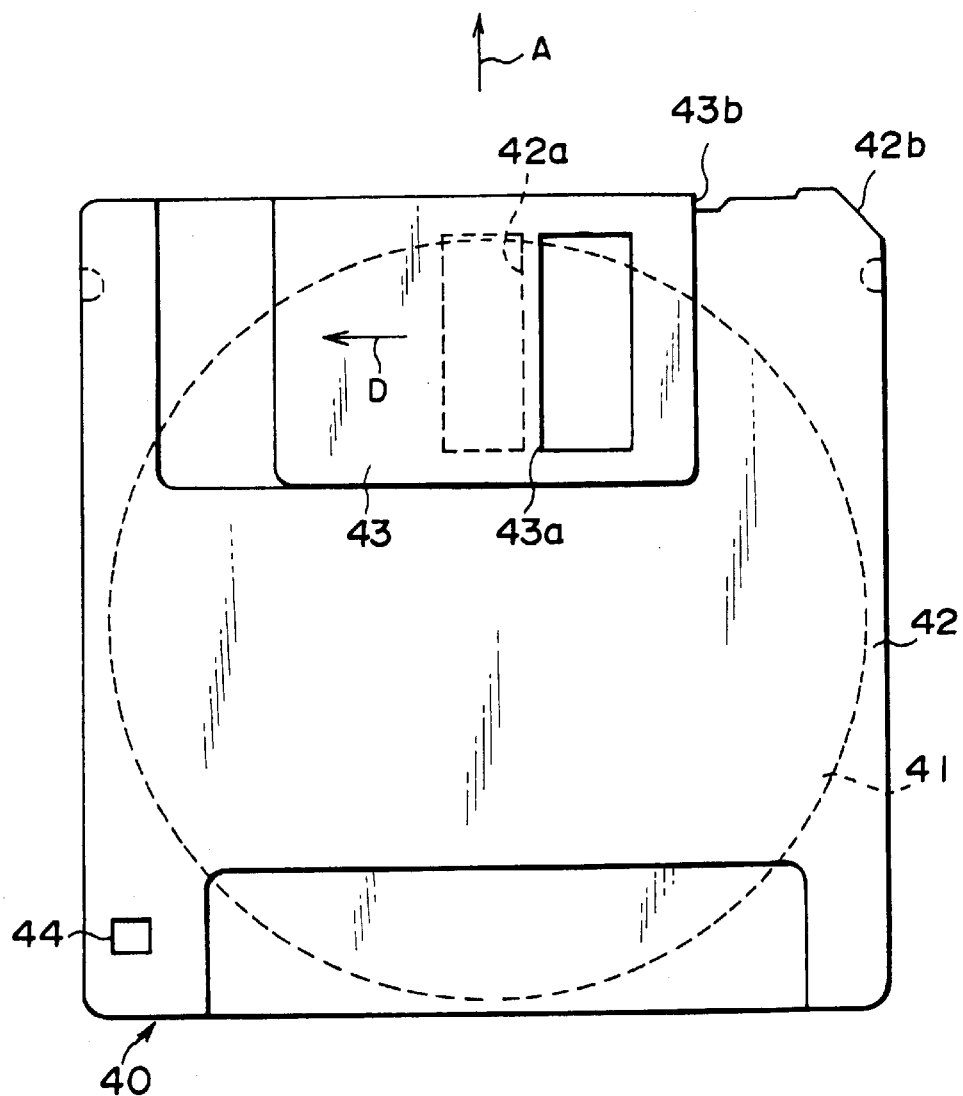
FIG. 3 is a plan view showing a floppy disk driven by the floppy disk drive.

Referring to FIG. 3, the description will proceed to the floppy disk (FD) driven by the floppy disk drive (FDD) illustrated in FIGS. 1 and 2. The illustrated floppy disk depicted at 40 comprises a disk-shaped magnetic recording medium 41, a shell 42 for covering or receiving the magnetic recording medium 41, and the shutter depicted at 43 slidably in a direction indicated by an arrow D in FIG. 3. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 1 and 2) of the floppy disk drive.

In a state where the floppy disk 40 is not loaded in the floppy disk drive, the head window 43a is covered by the shutter 43 as shown in FIG. 3. When the floppy disk 40 is loaded in the floppy disk drive, the projection part 242 of the eject lever 42 (FIG. 1) engages with the upper end 43b of the right-hand side edge of the shutter 43 to slide the shutter 43 in the direction depicted at the arrow D.

The shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 3.

As described above, in the floppy disk 40 driven by the floppy disk drive, the magnetic recording medium 41 accessed by the magnetic heads 14 (FIGS. 1 and 2) has a plurality of tracks on a surface thereof that serve as paths for recording data and that are formed in a concentric circle along a radial direction. The floppy disk 40 has eighty tracks on side which include the most outer circumference track (the most end track) TR00 and the most inner circumference track TR79.

Figure 4:
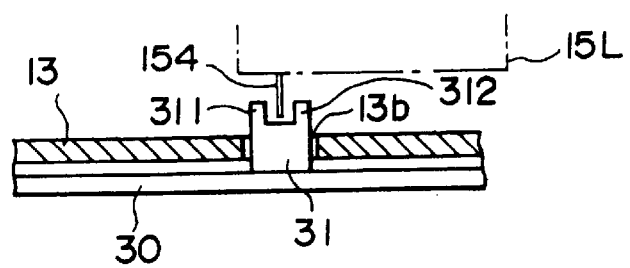
FIG. 4 is a sectional view for use in describing a set-up structure of a track position detecting mechanism (00 sensor) used in the floppy disk drive.

Referring to FIG. 4 in addition to FIG. 1, the description will proceed to a track position detecting mechanism (a 00 sensor) for detecting a position of the most end track TR00 of the magnetic recording medium 41.

In the carriage assembly 15, the lower carriage 15L is provided with an interception plate 154 which projects from a base section thereof downwards. On the other hand, the main printed substrate depicted at 30 is disposed on the back surface of the main frame 13 opposed to the carriage assembly 15. On the main printed substrate 30, a photointerrupter 31, which is used as the track position detecting mechanism (the 00 sensor), is mounted. For this purpose, the main frame 13 has a bore 13b in which the photointerrupter 31 is inserted.

In the manner which is well known in the art, the photointerrupter 31 comprises a first protrusion section 311 into which a light-emitting element (which will later be described) is built and a second protrusion section 312 into which a light-receiving element (which will later be described) is built. The first protrusion section 311 and the second protrusion section 312 are opposed to each other at two opposite wall surfaces which have two opening sections (not shown), as shown in FIG. 4. Through the two opening sections, an optical path is formed to go from the light-emitting element to the light-receiving element. In addition, the above-mentioned interception plate 154 passes through a path between the first protrusion section 311 and the second protrusion section 312.

In the 00 sensor with such a structure, it is possible to detect that the magnetic heads 14 (FIGS. 1 and 2) are laid in the position of the most end track TR00 in the magnetic recording medium 41 of the flexible disk 40 because the interception plate 154 intercepts the optical path in the photointerrupter 31.

Figure 5:
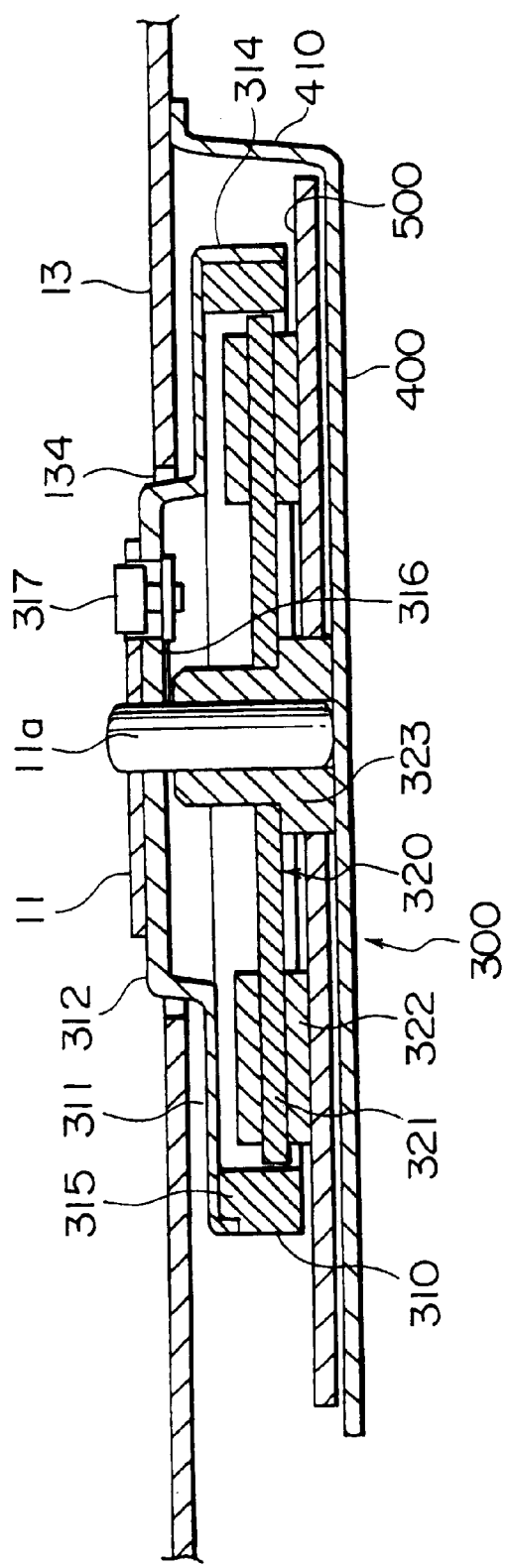
FIG. 5 is a sectional view showing a relationship between a main frame and a DD motor (spindle motor) mounted thereon in the floppy disk drive illustrated in FIG. 1.

Referring now to FIG. 5, the description will proceed to the spindle motor (DD motor) for use in the above-mentioned floppy disk drive.

The illustrated DD motor depicted at 300 comprises a rotor 310 and a stator 320 combined with the rotor 310. The rotor 310 comprises a disk-shaped metallic casing 311 which has a protruding portion 312 formed at its center to protrude upward. The protruding portion 312 has an upper surface on which the above-mentioned disk table 11 is mounted. The main frame 13 has a circular opening 134 which allows only an upper part of the protruding portion 312 to pass therethrough and project on the main surface of the main frame 13. As a result, the disk table 11 is projected on the main surface of the main frame 13.

The rotation axis or shaft 11a made of metal is integrally fixed to the rotor 310 at the center thereof to pass through the casing 311 and the disk table 11. When the disk table 11 is injection-molded by the use of a plastic magnet, the casing 311 and the rotation shaft 11a are integrally assembled. The casing 311 has a cylindrical member 314 formed on its outer periphery to extend downward. A ring-shaped permanent magnet 315 is attached to an inner surface of the cylindrical member 314.

The permanent magnet 315 has a plurality of main magnetized elements along a circumferential direction thereof. In addition, the permanent magnet 315 has a bottom portion which has a plurality of motor-servo magnetized elements along a circumferential direction thereof. When the later-mentioned stator 320 has fifteen poles, the main magnetized elements are equal in number to twenty (that is, north poles N are equal in number to ten and south poles S are equal in number to ten). On the other hand, the motor-servo magnetized elements are equal to one hundred and twenty (that is, north poles N are equal in number to sixty and south poles S are equal in number to sixty) independently of the number of the poles of the stator 320. The main magnetized elements are called driving magnetized portions while the motor-servo magnetized elements are called detection magnetized portions.

In addition, as shown in FIG. 5, the cylindrical member 314 has a cut portion from which a part of the main magnetized elements protrudes and is exposed as a magnetic pole.

The protruding portion 312 is provided with an arm 316 attached to a bottom surface thereof. A drive roller 317 is rotatably mounted on the arm 316. Each of the protruding portion 312 and the disk table 11 has a generally rectangular hole formed therein. Through these holes, the drive roller 317 projects upward from the disk table 11. The floppy disk 40 (FIG. 3) received in the floppy disk drive is placed on the disk table 11. The drive roller 317 is inserted in and engaged with a hole (not shown) formed in a hub (not shown) of the floppy disk 40. Thus, the magnetic disk medium 41 (FIG. 3) is rotated following the rotation of the rotor 310.

On the other hand, the stator 320 is attached to a back surface of the main frame 13 by means of a motor frame 400 made of metal. More specifically, the stator 320 is formed on a printed wiring board 500 mounted on the principal surface of the metallic motor frame 400. The stator 320 comprises a core assembly having a plurality of stator cores 321, a plurality of stator coils 322, and a center metal (bearing unit) 323. Each of the stator core 321 extends radially outwardly from an outer periphery of a ring-shaped member of the center metal 323. Each of stator coils 322 is wound around an end portion of each corresponding stator core 321. The center metal 323 is formed at the center of the printed wiring board 500 and rotatably supports the rotation shaft 11a. The motor frame 400 has a plurality of attaching elements 410 of an inverted-L shape which extend upward from a peripheral edge of the motor frame 400 to abut against the back surface of the main frame 13.

Figure 6:
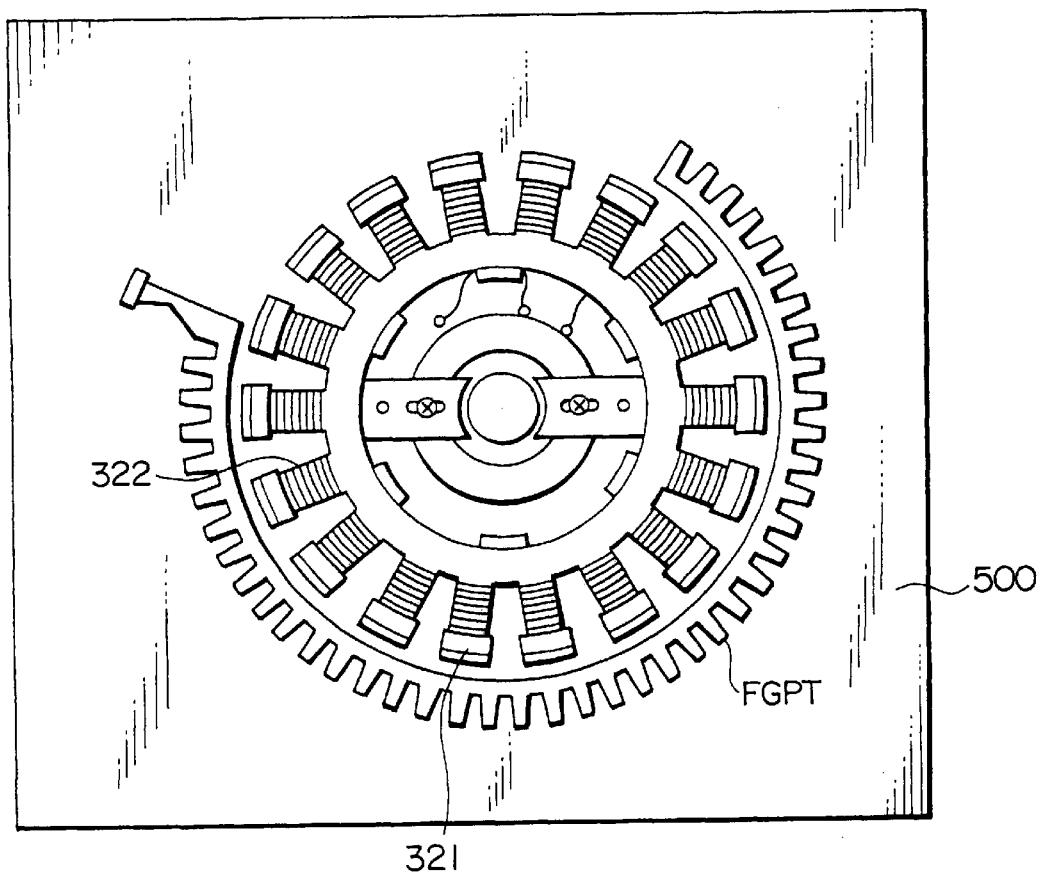
FIG. 6 is a plan view for use in describing a structure of a stator in the DD motor illustrated in FIG. 5.

As shown in FIG. 6, on the printed wiring board 500, a frequency generation pattern FGPT is formed around the stator 320 of the DD motor 300. In other words, the frequency generation pattern FGPT is arranged to oppose to the motor-servo magnetized elements (detection magnetized portions) of the permanent magnet 315 such that a predetermined gap is formed distance left therebetween. In addition, FIG. 6 illustrates a case where the stator 320 has eighteen poles. That is, the stator cores 321 (or the stator coils 322) of the stator 320 are equal in number to eighteen. In this event, the rotor 310 has the main magnetized elements which are equal in number to twenty-four. In this connection, as described above, when the stator 320 has fifteen poles, the rotor 310 has the main magnetized elements which are equal to twenty.

When the motor-servo magnetized elements of the permanent magnet 315 rotate over the frequency generation pattern FGPT, a counterelectromotive force generates in the frequency generation pattern FGPT. Inasmuch as the motor-servo magnetized elements of the permanent magnet 315 are equal in number to one hundred and twenty for a round, a signal of sixty cycles generates from the frequency generation pattern FGPT when the DD motor 300 makes one rotation. This signal is called an FG servo signal. When the number of revolutions of the DD motor 300 is equal to 300 RPM, the DD motor 300 makes five rotations per second. In this event, the FG servo signal has a frequency of (60×5) or 300 Hz.

Accordingly, it is possible to control the rotation speed of the DD motor 300 by comparing the FG servo signal with a divided clock signal having a divided clock frequency of 300 Hz which is obtained by frequency dividing a reference clock signal having a reference clock frequency of 1 MHz by using a counter. In other words, a speed control of the DD motor 300 is carried out by starting the counter in synchronism with a leading edge timing of the FG servo signal and by comparing a trailing edge timing of the FG servo signal with a trailing edge timing of the divided clock signal which is obtained by counting a fixed value in the counter. More specifically, if the trailing edge timing of the FG serve signal is earlier than the trailing edge timing of the divided clock signal, the DD motor 300 is controlled so as to decelerate the rotation speed of the DD motor 300. Conversely, if the trailing edge timing of the FG serve signal is later than the trailing edge timing of the divided clock signal, the DD motor 300 is controlled so as to accelerate the rotation speed of the DD motor 300.

As described above, the conventional floppy disk drive comprises not only the main frame 13 but also the motor frame 400 for mounting the DD motor (spindle motor) 300 thereon. In other words, the motor frame 400 is composed of another piece different from the main frame 13. In addition, the main frame 13 is also called a main chassis while the motor frame 400 is also called a motor base.

Figure 7:
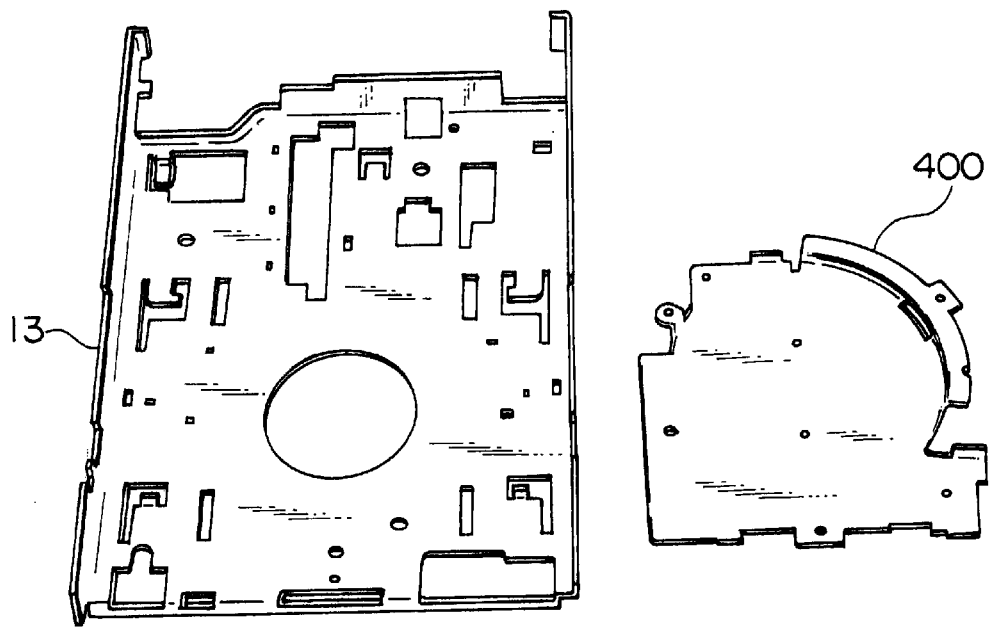
FIG. 7 is a schematic perspective view of the main frame and a motor frame, individually, for use in the floppy disk drive illustrated in FIGS. 1 and 2 as view from upper front obliquely.
Figure 8:
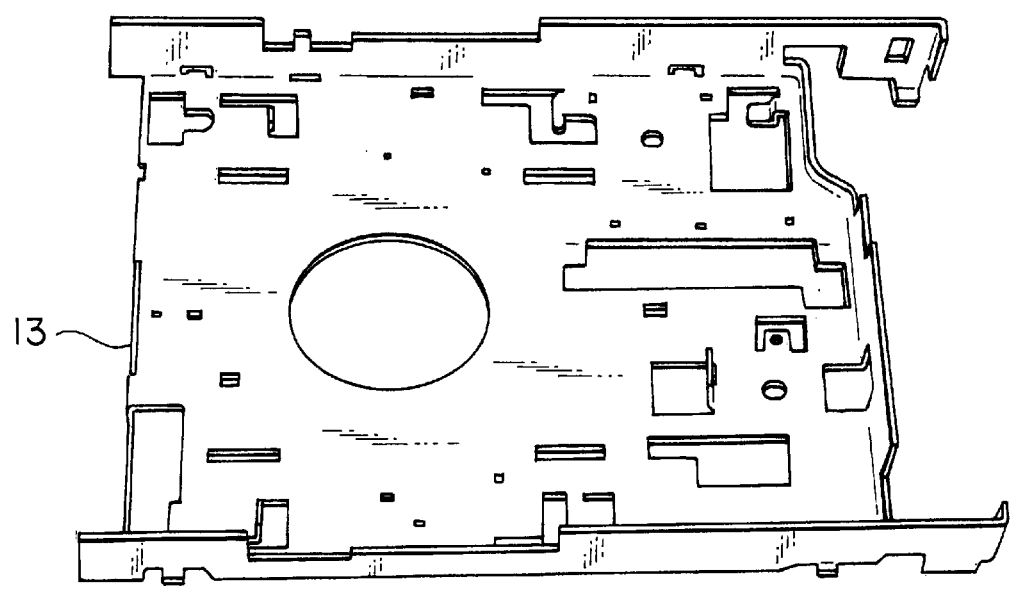
FIG. 8 is a schematic perspective view of only the main frame illustrated in FIG. 7 as view from upper side obliquely.
Figure 9:
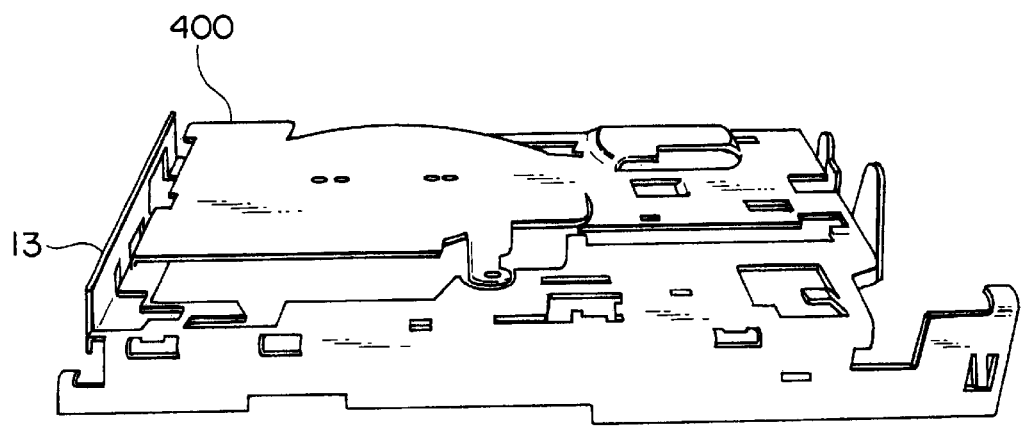
FIG. 9 is a schematic perspective view of a state where the motor frame is mounted on the main frame by using screws as view from lower side obliquely.

FIG. 7 is a schematic perspective view of the main frame (main chassis) 13 and the motor frame (motor base) 400, individually, for use in the floppy disk drive illustrated in FIGS. 1 and 2 as view from upper front obliquely. In addition, FIG. 8 is a schematic perspective view of only the main frame 13 as view from upper side obliquely. Furthermore, FIG. 9 is a schematic perspective view of a state where the motor frame 400 is mounted on the main frame 13 by using screws (not shown) as view from lower side obliquely.

Figure 10:
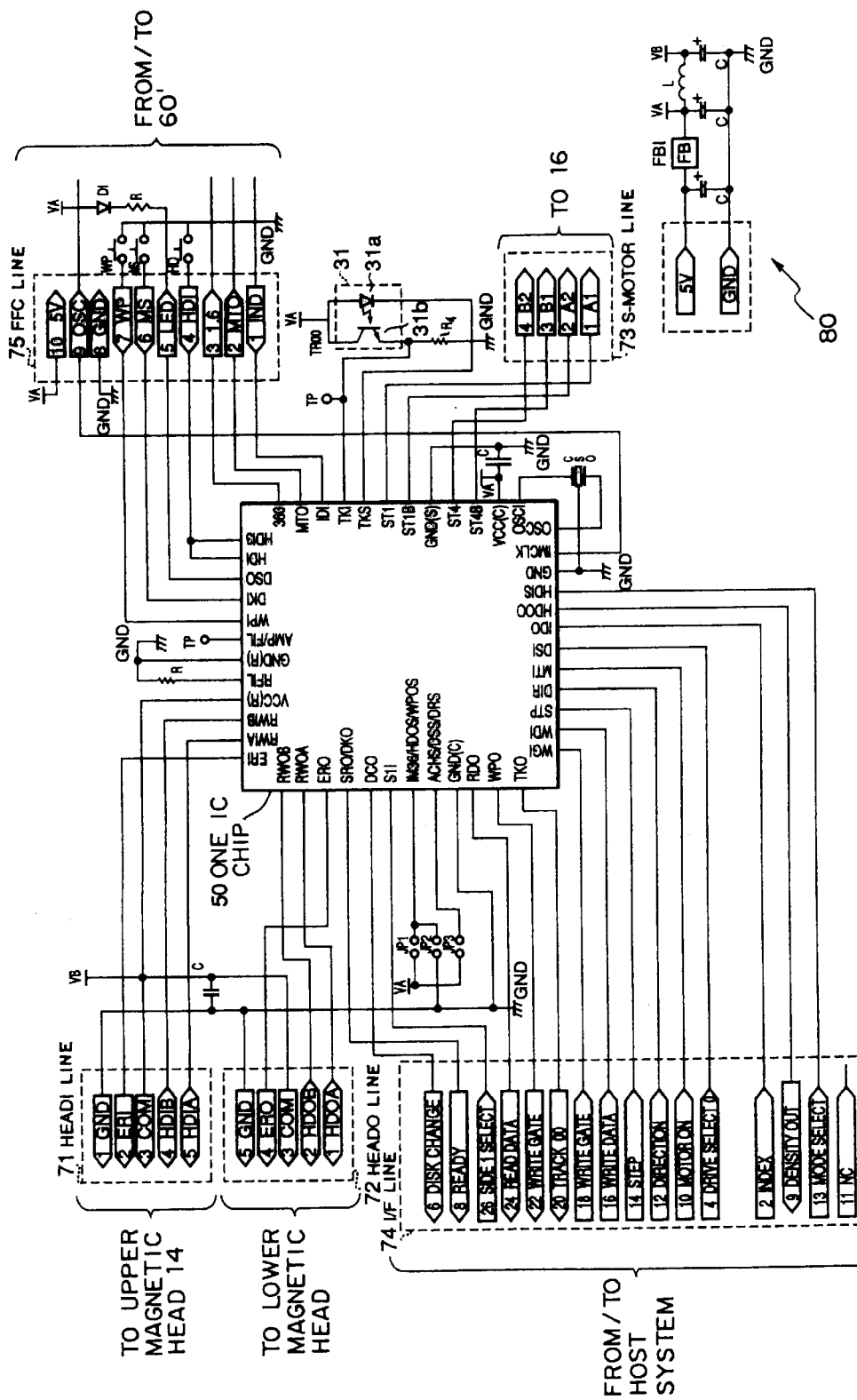
FIG. 10 is a plan view showing an external appearance of one IC chip of a conventional FDD control apparatus for controlling the floppy disk drive illustrated in FIGS. 1 and 2.
Figure 11:
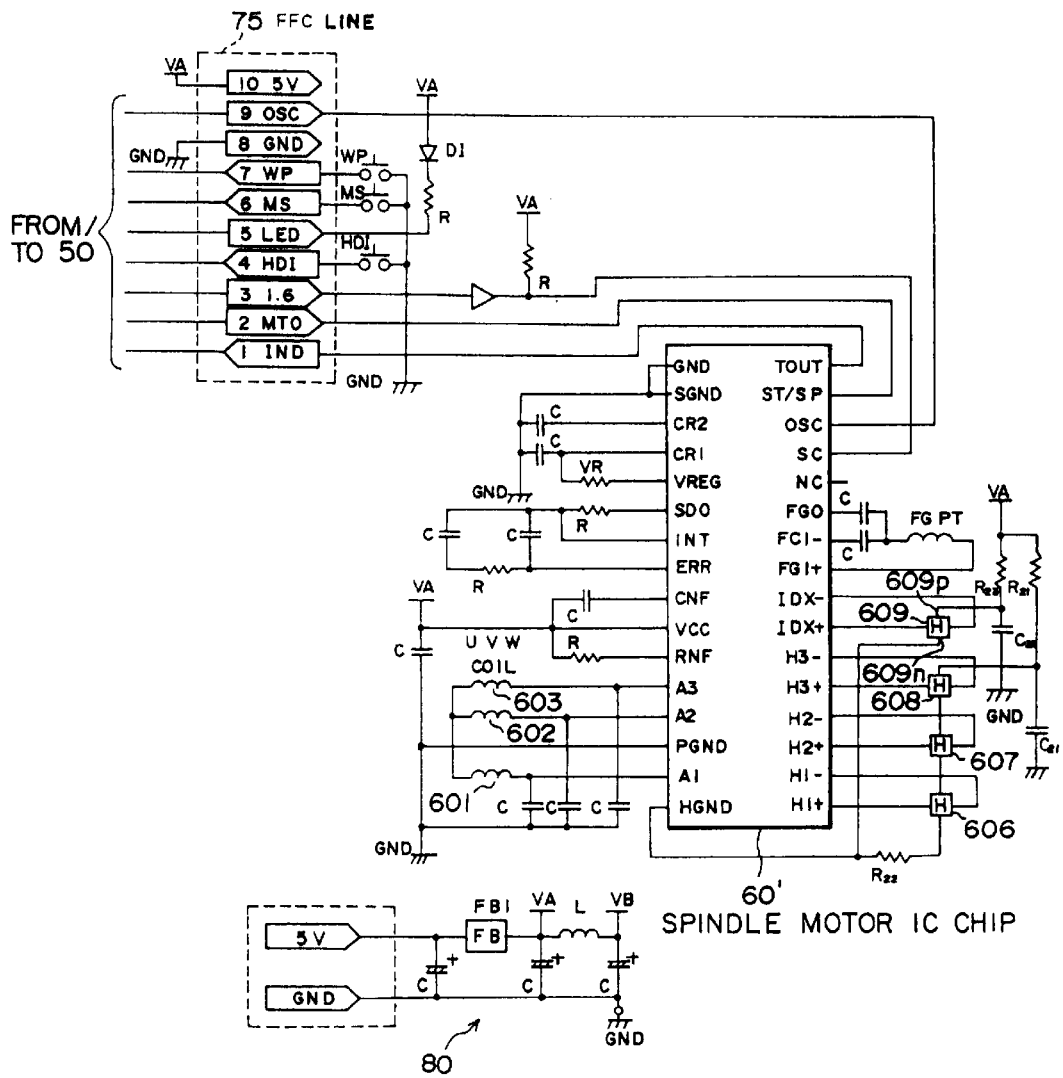
FIG. 11 is plan view showing an external appearance of a spindle motor IC chip of the conventional FDD control apparatus that is used together with the one IC chip illustrated in FIG. 10.

Referring to FIGS. 10 and 11, the description will proceed to a conventional FDD control apparatus for controlling the conventional floppy disk drive illustrated in FIGS. 1 and 2.

The illustrated FDD control apparatus comprises one integrated circuit (IC) chip 50 (FIG. 10), a spindle motor IC chip 60' (FIG. 11), and a power supply circuit 80. The one IC chip 50, the spindle motor IC chip 60', and the power supply circuit 80 are mounted on the main printed substrate 30 (FIG. 4). The spindle motor IC chip 60' is an IC chip for controlling drive of the spindle motor 300 (FIG. 5) and is implemented by a bipolar IC chip where a number of bipolar transistors are integrated therein. On the other hand, the one IC chip 50 is implemented by a metal oxide semiconductor (MOS) IC chip where a number of MOS field effect transistors (FETs) are integrated therein. The power supply circuit 80 is a circuit for supplying a voltage of 5 V when a power switch (not shown) is turned on. The power supply circuit 80 has a first power supply terminal VA and a second power supply terminal VB.

Figure 12:
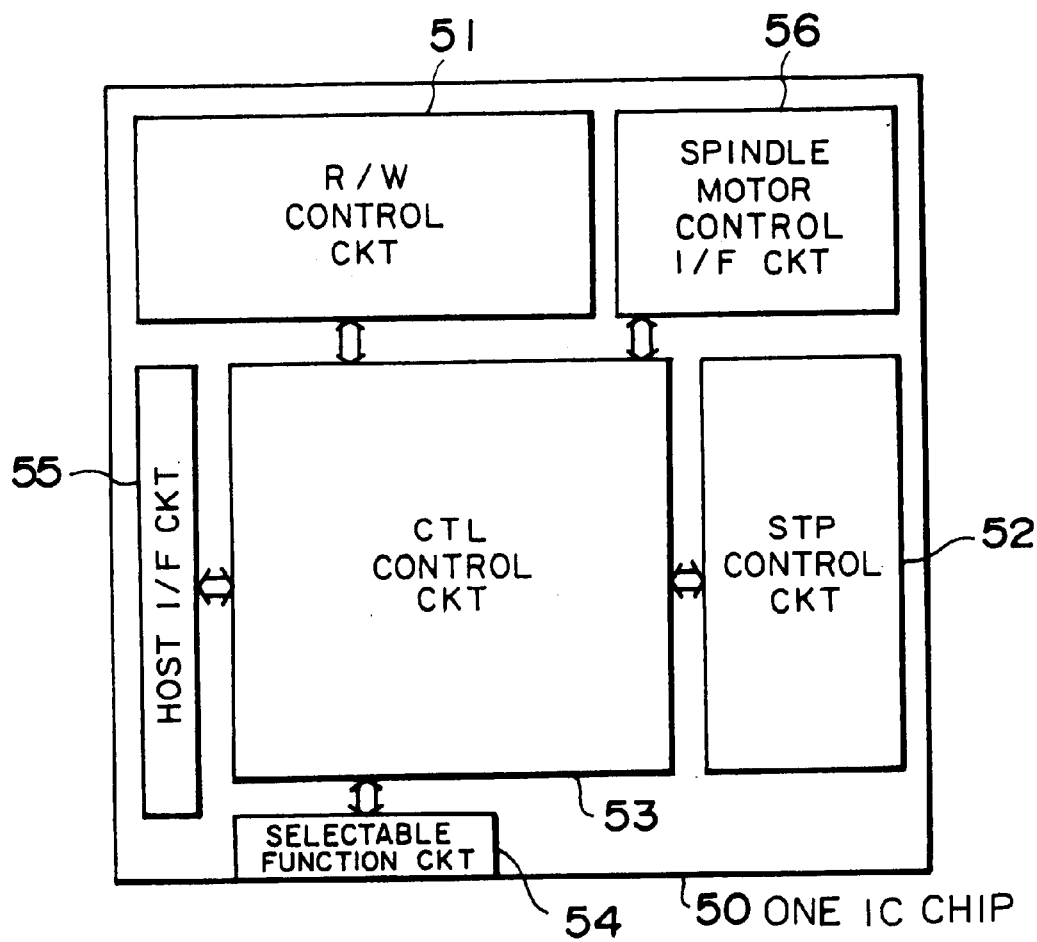
FIG. 12 is a block diagram showing a schematic structure of the one IC chip illustrated in FIG. 10.

Referring to FIG. 12 in addition to FIG. 10, the one IC chip 50 incorporates first through third control circuits 51, 52, and 53 therein. The first control circuit 51 is a R/N control circuit for controlling reading/writing of data. The second control circuit 52 is a STP control circuit for controlling drive of the stepping motor 16 (FIG. 1). The third control circuit 53 is a CTL control circuit for controlling whole operation of the floppy disk drive and may be called a logic circuit.

The one IC chip 50 further comprises the above-mentioned selectable function circuit depicted at 54, a host interface (I/F) circuit 55, and a spindle motor control I/F circuit 56. The CTL control circuit 53 is connected to R/W control circuit 51, the STP control circuit 52, the selectable function circuit 54, the host I/F circuit 55, and the spindle motor control I/F circuit 56.

The R/W control circuit 51 is connected to the upper magnetic head 14 (FIG. 1) and the lower magnetic head through a HEAD1 line 71 and a HEAD0 line 72, respectively. The STP control circuit 52 is connected to the stepping motor 16 (FIG. 2) through an S-MOTOR line 73. The host I/F circuit 55 is connected to a host system (not shown) through an I/F line 74. The spindle motor control I/F circuit 56 is connected to the spindle motor IC chip 60' (FIG. 11) through an FFC line 75.

Now, the description will proceed to input/output terminals of the one IC chip 50. The one IC chip 50 has R/W output terminals (ER1, RW1A, RW1B, ER0, RW0A, RW0B, VCC(R)) which are connected to the HEAD1 line 71 and the HEAD0 line 72. In addition, the one IC chip 50 has STP output terminals (ST1, ST1B, ST4, ST4B) which are connected to the S-MOTOR line 73. Furthermore, the one IC chip 50 has host input/output terminals (DC0, SII, RD0, WP0, TK0, WGI, WDI, STP, DIR, MTI, DSI, ID0, HDO0, HDIS) which are connected to the I/F line 74. The one IC chip 50 has spindle motor controlling input/output terminals (IDI, MTO, 360, HDI3, HDI, DSO, DKI, WPI, 1MCLK) which are connected to the FFC line 75. Other than these input/output terminals, the one IC chip 50 has two selectable function input terminals (1M36/HDOS/NPOS, ACHS/DSS/DRS), three input terminals for the 00 sensor (AMP/FIL, TKI, TKS), and so on.

The photointerrupter 31 serving as the 00 sensor which comprises a light emitting diode (LED) 31a acting as the light-emitting element and a photo transistor 31b acting as the light-receiving element. The light emitting diode 31a has an anode connected to the first power supply terminal VA (Vcc) and a cathode connected to the TKS terminal of the one IC chip 50. The photo transistor 31b has a collector connected to the first power supply terminal VA (Vcc). In addition, the photo transistor 31b has an emitter which is grounded through a resistor $R_4$ and which is connected to the TKI terminal and the AMP/FIL terminal of the one IC chip 50.

Turning to FIG. 11, the spindle motor 300 controlled by the spindle motor IC chip 60' is a brushless three-phase D.C. motor which has three-phase coils (stator windings) 601, 602, and 603 of U-phase, V-phase, and W-phase although detailed structure thereof is illustrated in FIG. 5 as described above. In addition, the spindle motor 300 comprises the permanent magnet type rotor 310 (FIG. 5) and a rotor position detector (which will later be described) for producing rotor position detected signals. On the other hand, the spindle motor IC chip 60' incorporates a driving transistor (a transistor rectifier) therein which consists of a plurality of bipolar transistors. That is, responsive to a rotor position of the motor, the spindle motor 300 makes the bipolar transistors turn on and off to flow an electric current in the stator winding in question, thereby generates torque between magnetic poles of the rotor 310 and the stator windings 322 to rotate the rotor 310. With rotation of the rotor 310, the rotor position detected signals produced by the rotor position detector are changed in order to change the stator windings 322 flowing the electric current, thereby continuing the rotation of the rotor 310.

In addition, the spindle motor 300 comprises the frequency generation pattern FGPT for detecting the rotation speed of the rotor 310 as shown in FIG. 6. The spindle motor IC chip 60' changes the stator windings 322 to flow the electric current on the basis of the rotation speed of the rotor 310 detected by the frequency generation pattern FGPT in accordance with the rotor position detected signals produced by the rotor position detector.

As shown in FIG. 11, three Hall elements 606, 607, and 608 are used as the above-mentioned rotor position detector. See, for example, U.S. Pat. No. 4,882,511 issued to Johann von der Heide as regards detailed relationship for arrangement of the thee Hall elements 606 to 608. At any rate, the three Hall elements 606 to 608 are arranged at intervals of an electric angle of 120 degrees. In addition, another Hall element 609 is used for detection of an index.

Figure 13:
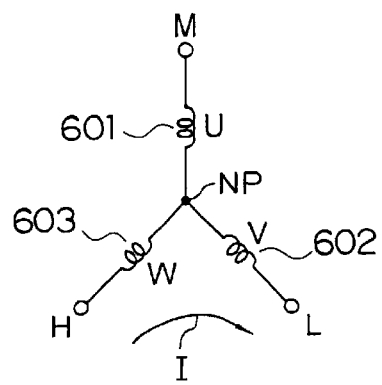
FIG. 13 is a view showing a state of an electric current flowing three-phase coils.

As shown in FIG. 13, the three-phase coils 601, 602, and 603 of U-phase, V-phase, and W-phase have a neutral point or a common connection terminal NP and are made star connection or Y-connection. The three coils 601, 602, and 603 of U-phase, V-phase, and W-phase are hereinafter called a U-phase coil, a V-phase coil, and a W-phase coil, respectively. In the example being illustrated in FIG. 13, an electric current I flows into the W-phase coil 603 while the electric current I flows out of the V-phase coil 602. A state of the coil where the electric current I flows in is depicted at "H" while a state of the coil where the electric current I flows out is depicted at "L". In addition, the coil put into a "H" state is called a source coil while the coil put into a "L" state is called a sink coil. Accordingly, in a case of the example as illustrated in FIG. 13, the W-phase coil put into the "H" state is the source coil while the V-phase coil put into the "L" state is the sink coil. In addition, a state of the coil where the electric current I neither flows in nor flows out is called a high-impedance state and is depicted at "M". That is, in a case of the example as illustrated in FIG. 13, the U-phase coil 601 is put into the high-impedance state or a "M" state.

In the manner which is described above, among the three-phase coils 601 to 603, any one is put into the "H" state, another one is put into the "L" state, and the remaining one is put into the "M" state. Accordingly, there are first through sixth states as states of the electric current I flowing through the three-phase coils 601 to 603 in the manner which will later become clear.

On the other hand, in the manner which is described above in conjunction with FIG. 5, the rotor 310 of the DD motor 300 comprises the ring-shaped permanent magnet 315 having the plurality of main magnetized elements in a circumferential direction equidistantly placed. In addition, the stator 320 comprises the plurality of stator cores or poles 321 and the plurality of stator coils 322 each of which is wound around each corresponding core. It is assumed that the number of the main magnetized elements of the rotor 310 and the number of the poles 321 of the stator 320 are represented by M and N, respectively. In this event, a radio M:N is generally equal to 4:3.

For instance, when the main magnetized elements of the rotor 310 are equal in number to twenty, the poles 321 of stator 320 are equal in number to fifteen. That is, each of the V-phase coil 601, the V-phase coil 602, and the W-phase coil 603 has five stator coils 322. Under the circumstances, the main magnetized elements of the rotor 310 are arranged in the circumferential direction at an angular distance of 18 degrees while the poles 322 of the stator 320 are arranged in the circumferential direction at an angular distance of 24 degrees. Arranged at the electric angle of 120 degrees, the three Hall elements 606 to 608 (FIG. 11) detect magnetic fields of the main magnetized elements in the rotor 310 to produce three detected signals. Supplied with the three detected signals as three input conditions, the spindle motor IC chip 60' (FIG. 11) switches the three-phase coils 601, 602, and 603 of U-phase, V-phase, and W-phase through which the electric current I should be flowed.

Figure 14:
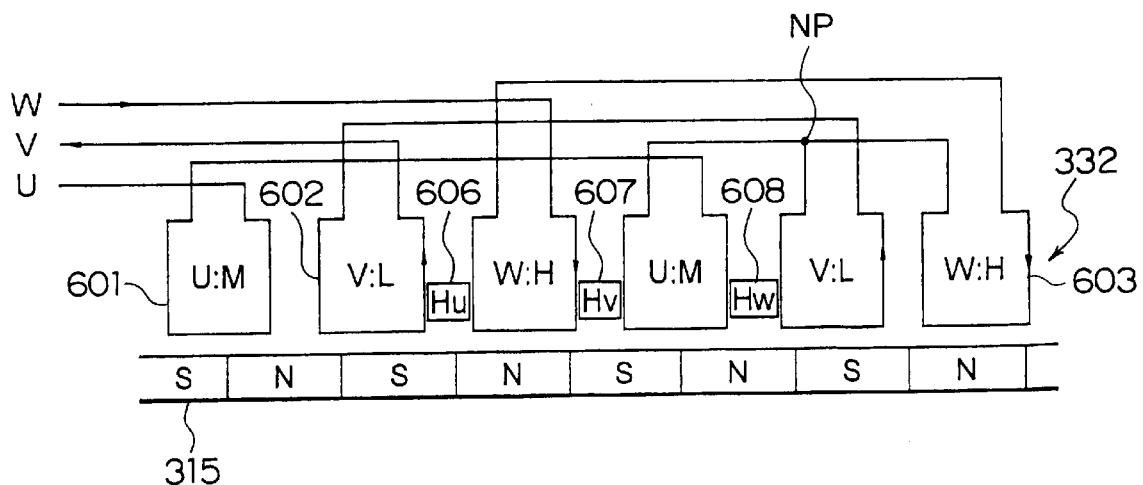
FIG. 14 illustrates a relationship between an arrangement of a part of the DD motor and an arrangement of three Hall elements for use in the conventional FDD control apparatus.

FIG. 14 illustrates a relationship between an arrangement of a part of the DD motor 300 and an arrangement of the three Hall elements 606 to 608. In the example being illustrated, the DD motor 300 comprises the rotor 310 having twenty main magnetized elements and the stator 320 having fifteen poles or stator cores 321. FIG. 14 illustrates only the part of the DD motor 300, that is, a part of eight main magnetized elements and of six poles. In FIG. 14, the three Hall elements 606 to 608 are depicted at Hu, Hv, and Hw, respectively, and the three-phase coils 601, 602, and 603 of U-phase, V-phase, and W-phase are merely depicted U, V, and W, respectively.

FIG. 14 illustrates a state similar to that illustrated in FIG. 13. That is, the U-phase coil 601 is put into the "M" state, the V-phase coil 602 is put into the "L" state, and the W-phase coil 603 is put into the "H" state. In this event, in the manner which is apparent from FIG. 14, the Hall element Hu detects a south pole S in the permanent magnet 315, the Hall element Hv detects the south pole S in the permanent magnet, and the Hall element Hw detects a north pole N in the permanent magnet 315. In other words, when the Hall elements Hu, Hv, and Hw detect the south pole S, the south pole S, and the north pole N in the permanent magnet 315, the spindle motor IC chip 60' must exchanges the three-phase coils 601 to 603 so as to make the U-phase coil 601, the V-phase coil 602, and the W-phase coil 603 the high-impedance state, the sink coil, and the source coil, respectively.

A following table 1 shows the above-mentioned first through sixth states which represent relationships between the input conditions of the three Hall elements Hu (606), Hv (607), and Hw (608) and three phase outputs Uout, Vout, and Wout of the three-phase coils 601, 602, and 603 of U-phase, V-phase, and W-phase.

TABLE 1

| | Hall input conditions | | | phase outputs | | |
|---|---|---|---|---|---|---|
| | Hu | Hv | Hw | Uout | Vout | Wout |
| (i) | N | N | S | M | H | L |
| (ii) | S | N | S | L | H | M |
| (iii) | S | N | N | L | M | H |
| (iv) | S | S | N | M | L | H |
| (v) | N | S | N | H | L | M |
| (vi) | N | S | S | H | M | L |

The above-mentioned table 1 shows the first through the sixth states which are depicted at (i), (ii), (iii), (iv), (v), and (vi), respectively. In addition, the state illustrated in FIGS. 13 and 14 corresponds to the fourth state (iv) in the above-mentioned table 1.

In the manner which is described above in conjunction with FIGS. 7 through 9, the conventional floppy disk drive comprise not only the main frame 13 but also the motor frame 400. Accordingly, the conventional floppy disk drive is disadvantageous in that it requires a lot of parts and the number of processes for assembling increases, as mentioned in the preamble of the instant specification. In addition, the conventional floppy disk drive is also disadvantageous in that a characteristic of the spindle motor (DD motor) 300 is dispersed on mounting the motor frame 400 on the main frame 13 and it is therefore difficult to stabilize the spindle motor 300, as also mentioned in the preamble of the instant specification.

The present inventors has been variously examined as regards what way is adopted to do without the motor frame 400 as another piece different from the main frame 13. In the manner which is described in conjunction with FIGS. 5 and 6, the printed wiring board 500 is mounted on the motor frame 400 and the frequency generation pattern FGPT is formed on the printed wiring board 500. In other words, inasmuch as the frequency generation pattern FGPT is required in prior art, the printed wiring board 500 must have an area which is wider than an external form of the DD motor 300 as illustrated in FIG. 5. As a result, it is necessary to constitute the motor frame 400 as another piece different from the main frame 13 as illustrated in FIGS. 5, 7, and 9.

Accordingly, if it is possible to replace the frequency generation pattern FGPT with any way (means) which give play to a function equivalent thereto, it is possible to eliminate the frequency generation pattern FGPT. If so, the printed wiring board 500 required in prior art may be also not necessary or it is possible to use, as the printed wiring board, that having an area smaller than the external form of the DD motor 300. As a result, it must be not necessary to constitute a part (motor frame 400) on which the spindle motor is mounted as another piece different from the main frame 13. This is a conclusion obtained by the present inventors.

Figure 15:
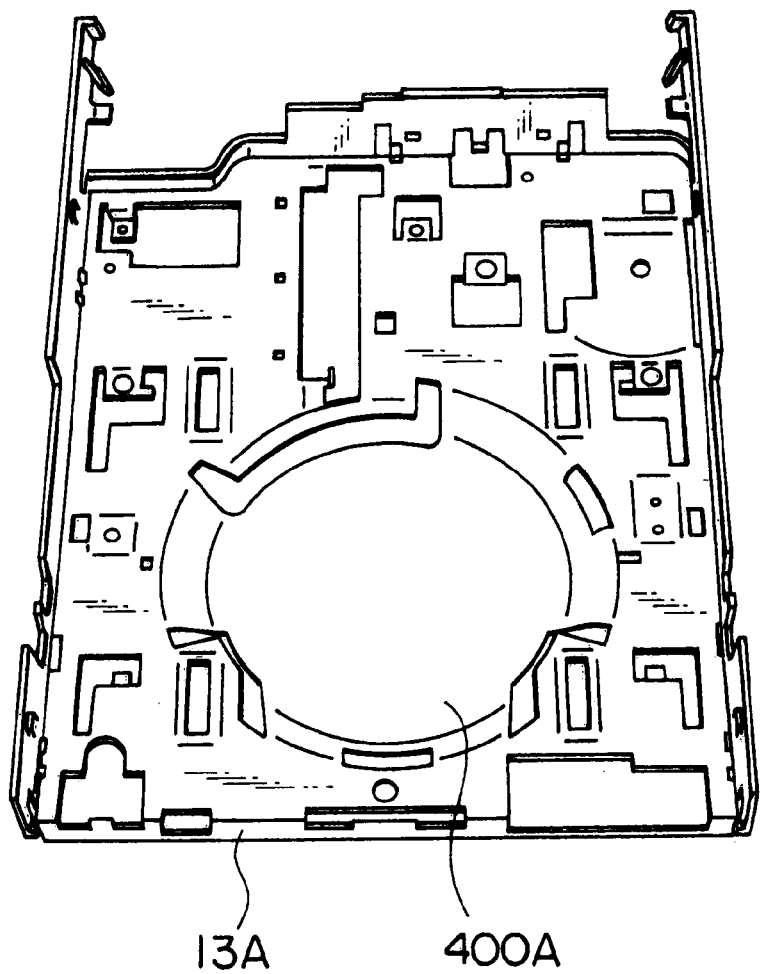
FIG. 15 is a schematic perspective view of a frame structure (main frame) for use in a floppy disk drive according to an embodiment of this invention as view from upper front obliquely.
Figure 16:
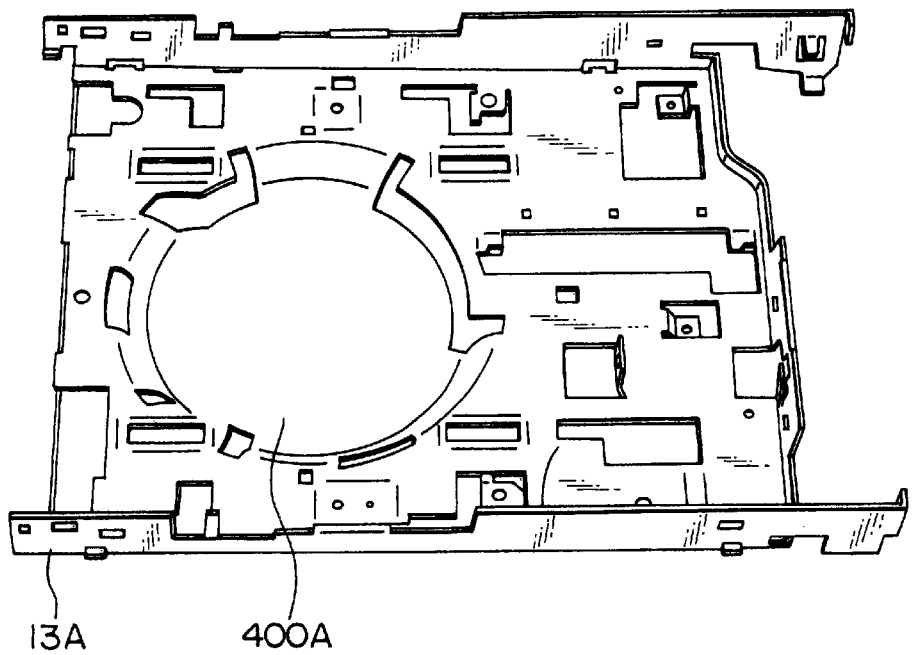
FIG. 16 is a schematic perspective view of the main frame illustrated in FIG. 15 as view from upper side obliquely.
Figure 17:
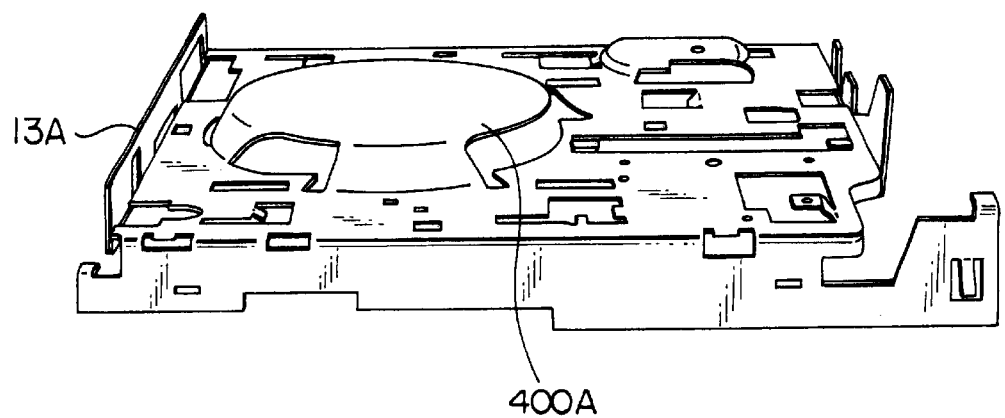
FIG. 17 is a schematic perspective view of the main frame illustrated in FIG. 15 as view from lower side obliquely.

Referring to FIGS. 15 through 17, the description will proceed to a frame structure or a main frame 13A for use in a floppy disk drive according to an embodiment of this invention. FIG. 15 is a schematic perspective view of the frame structure (main frame) 13A for use in the floppy disk drive as view from upper front obliquely. In addition, FIG. 16 is a schematic perspective view of only the main frame 13A as view from upper side obliquely. Furthermore, FIG. 17 is a schematic perspective view of the main frame 13A as view from lower side obliquely.

In the manner as apparent from FIGS. 15 through 17, the illustrated main frame (frame structure) 13A is composed of one piece in which the main frame 13A and a motor frame part 400A are integrated. The floppy disk 40 (FIG. 4) is inserted or loaded in the main frame 13A. The spindle motor 300 (FIG. 5) for rotatably driving the inserted floppy disk 40 is mounted on the motor frame part 400A. The motor frame part 400A has a drawn-shape obtained by drawing the main frame 13A.

In addition, although the drawn-shape of the motor frame part 400A is a circular shape, it is not restricted to this and may be a polygonal shape or an oval shape in response to depth or material of the motor frame part 400A. In addition, a drawing shirked shape in the drawn-shape of the motor frame part 400A is also not restricted to that illustrated in FIGS. 15 through 17 and may be various shapes. Furthermore, a connection way between the motor frame part 400A and the main frame 13A is also not restricted to that illustrated in FIGS. 15 through 17.

In the manner which is described above, inasmuch as the motor frame part 400A for mounting the spindle motor 300 thereon is composed of the one piece integrated into the main frame 13A, it is possible to reduce the number of parts. In addition, it is possible to reduce man-hour for assembling. Furthermore, inasmuch as the spindle motor 300 may be directly mounted on the motor frame part 400A, it is possible to suppress dispersion of a characteristic of the spindle motor 300 and to stabilize the spindle motor 300.

In addition, in the manner which will later be described, according to this invention, the frequency generation pattern FGPT (FIG. 6) required for controlling the spindle motor 300 is eliminated from the FDD control apparatus and the frequency generation pattern FGPT is therefore replaced with an electronic processing arrangement which is capable of giving full play to a function equivalent to that thereof. In addition, inasmuch as the frequency generation pattern FGPT is eliminated from the FDD control apparatus, it is not necessary for the FDD control apparatus to have the motor-servo magnetized elements formed on the bottom portion of the ring-shaped permanent magnet 315 (FIG. 5) of the rotor 310.

Now, the description will herein be made about a mere sketchy outline of a motor rotation control method according to this invention although a detailed operation principle thereof will later be described in detail.

Referring to FIG. 5, counterelectromotive forces generate in the stator coils 322 by detecting magnetic fields generated from the main magnetized elements of the ring-shaped permanent magnet 315 of the rotor 310 by using the stator coils 322 (the three-phase coils 601, 602, and 603 of the U-phase, the V-phase, and the W-phase) wound around the stator cores 321 of the stator 320 that are arranged in the vicinity of the ring-shaped permanent magnet 315. It is assumed that a ratio N:M is equal to 3:4, where N represent the number of the poles (stator cores) 321 of the stator 320 and M represents the number of the main magnetized elements formed in the ring-shaped permanent magnet 315 of the rotor 310.

More specifically, it will be assumed that the number M of the main magnetic elements in the rotor 310 is equal to twenty and the number N of the poles in the stator 320 is equal to fifteen. In this event, when the DD motor 300 makes one rotation, a signal of 30 cycles generates from the stator coils 322. The motor rotation control method according to this invention uses, as a servo signal, this signal generated from the stator coils 322. When the rotation speed of the DD motor 300 is equal to 300 RPM, the DD motor 300 makes five rotations per second. In this event, the servo signal has a frequency of (30×5) or 150 Hz.

Inasmuch as a servo method thereafter is similar to a conventional method except that a count number (a dividing ratio) of the counter (a frequency divider) is different, the description thereof is omitted.

Accordingly, it is possible to obtain the servo signal equivalent to the FG servo signal generated from the frequency generation pattern FGPT by electronically processing the counterelectromotive forces (electromotive forces) generated from the stator coils 322. As a result, it is possible to eliminate the frequency generation pattern FGPT required in prior art. Inasmuch as the frequency generation pattern FGPT is not necessary, the printed wiring board 500 (FIG. 6) required for forming the frequency generation pattern FGPT is not necessary or it is possible to minimize the printed wiring board in comparison with the external form of the DD motor 300. In addition, inasmuch as the frequency generation pattern FGTP is not necessary, it is also possible to eliminate an FG filter required as an exterior part therefor.

Referring now to FIGS. 18, 19, and 20A–20C, the description will be made about a method of obtaining the servo signal by electronically processing the couterelectromotive forces (electromotive forces) generated from the stator cores 322.

The description will be made about by exemplifying the DD motor 300 which comprises the rotor 310 having twenty main magnetized elements and the stator 320 having fifteen poles. In this event, the main magnetized elements in the rotor 310 are arranged in the circumferential direction at the angular distance of 18 degrees while the poles in the stator 320 are arranged in the circumferential direction at the angular distance of 24 degrees.

Figure 18:
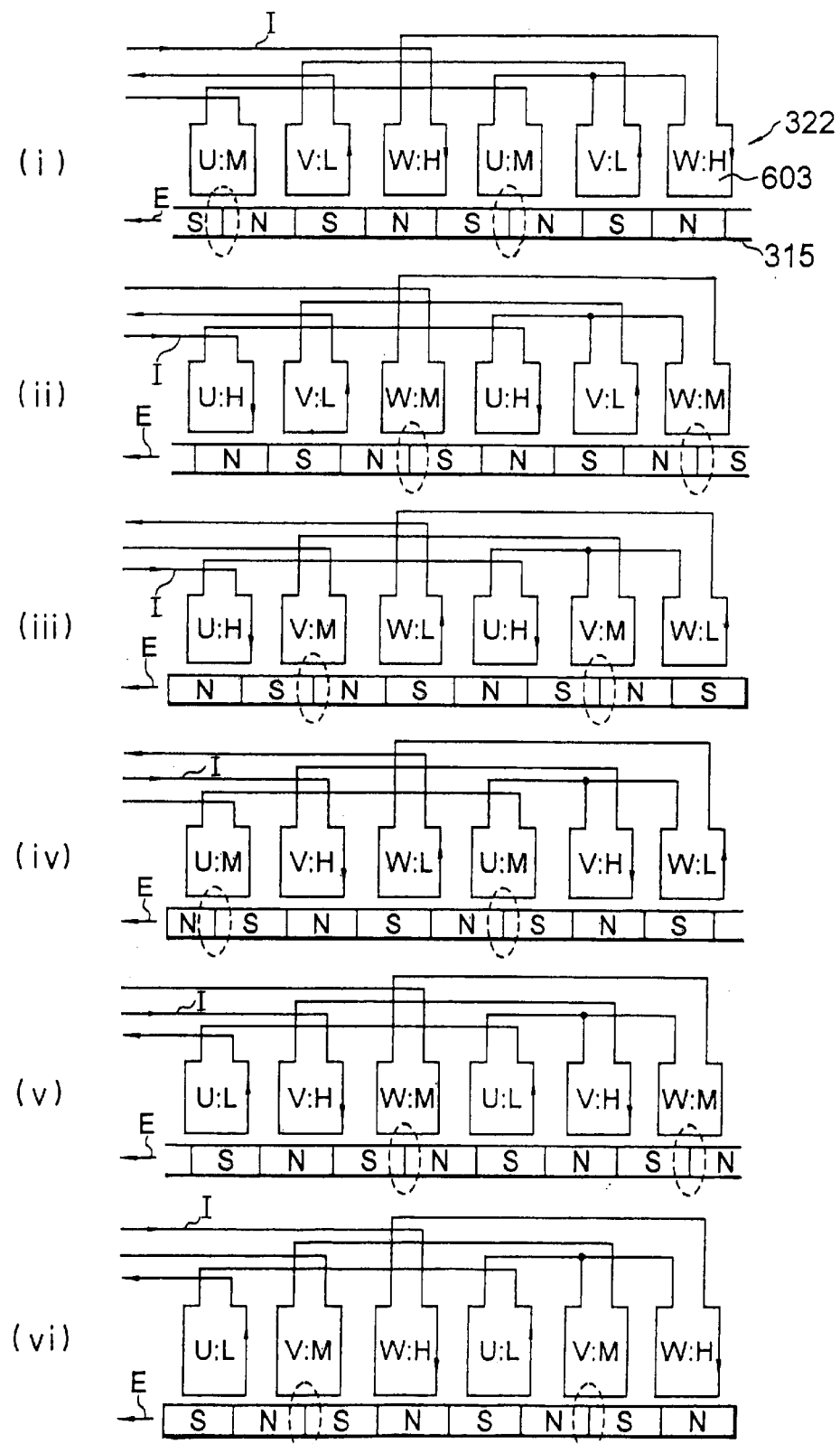
FIG. 18 illustrates first through sixth states (i)–(vi) of an arrangement in a part of a DD motor (a part of eight main magnetized elements and of six poles that correspond to a range of the angle of 144 degrees)
Figure 19:
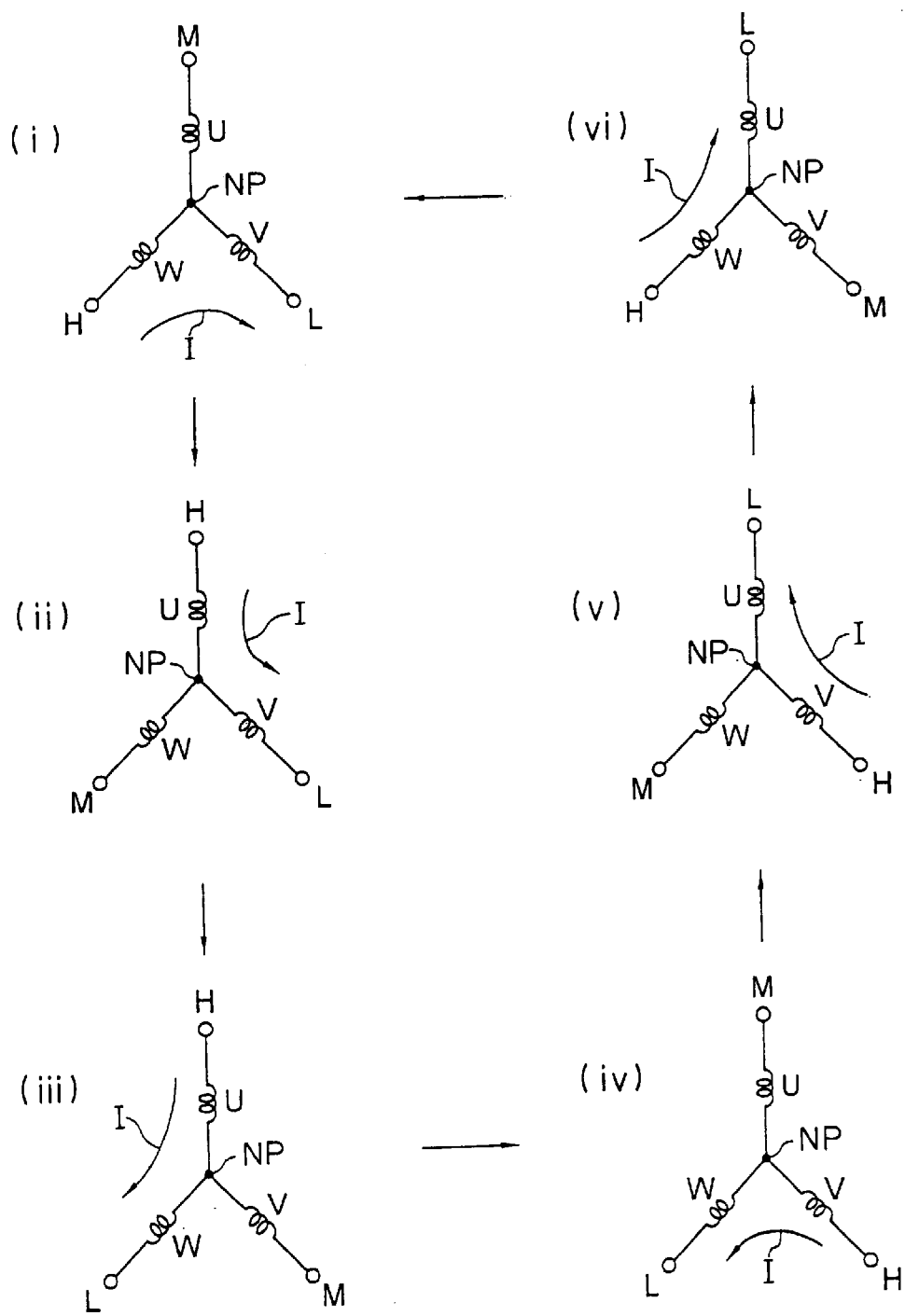
FIG. 19 illustrates directions of the electric current flowing through each stator coil of a stator in the first through the sixth states (i)–(vi)
Figure 20:
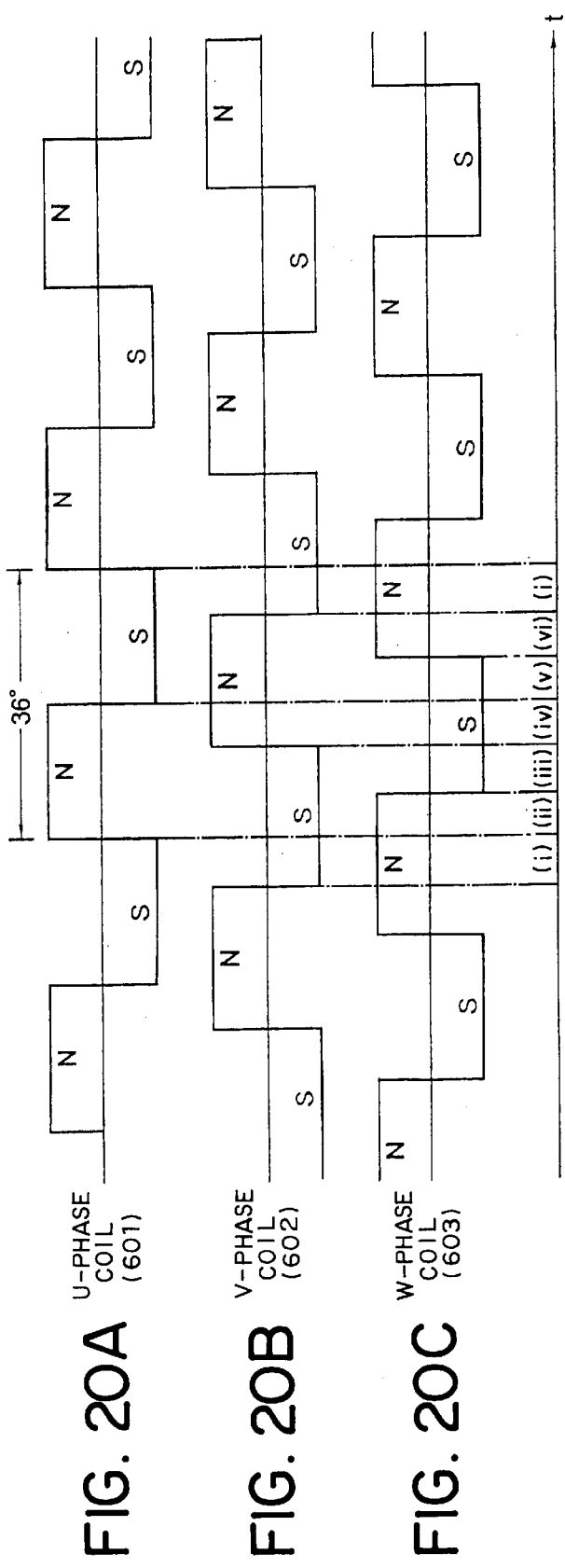
FIGS. 20A through 20C are time charts showing magnetic poles for a U-phase coil, a V-phase coil, and a W-phase coil where the U-phase coil, the V-phase coil, and the W-phase coil are opposite to the permanent magnet in the rotor, respectively.

FIG. 18 illustrates the first through the sixth states (i) through (vi) of the arrangement in a part of the DD motor 300, that is, a part of eight main magnetized elements and of six poles that correspond to a range of the angle of 144 degrees. In addition, FIG. 19 illustrates directions of the electric current I flowing through each stator coil 322 of the stator 320 in the first through the sixth states (i) through (vi). FIGS. 20A through 20C are time charts showing magnetic poles for the U-phase coil 601, the V-phase coil 602, and the W-phase coil 603 where the U-phase coil 601, the V-phase coil 602, and the W-phase coil 603 are opposite to the permanent magnet 315 (main magnetized elements) in the rotor 310, respectively.

Although there are the first through the sixth states (i) through (vi) for the electric current I flowing through the U-phase coil 601, the V-phase coil 602, and the W-phase coil 603 in the manner which is described above, it is necessary for the DD motor 300 to make the first through the sixth states (i) through (vi) generate in good order without making the first through the sixth states (i) through (vi) generate at random. More specifically, as the rotor 310 rotates in a direction depicted at an arrow E in FIG. 18, it is necessary for the DD motor 300 to shift the first through the sixth states (i) through (vi) such as (i), (ii), (iii), (iv), (v), (vi), (i), and so on and to repeat it, as shown along arrows in FIG. 19. During one repetition period, the rotor 310 rotates by an angle of 36 degrees, as shown in FIGS. 20A through 20C.

It will be now assumed, as shown in the first state (i) in FIGS. 18 and 19, that the U-phase coil 601 is put into the high-impedance state or the "M" state, the W-phase coil 603 is operable as the source coil or is put into the "H" state, and the V-phase coil 602 is operable as the sink coil or is put into the "L" state. In this event, the electric current I flows into the W-phase coil 603 through the neutral point NP and flows out of the V-phase coil 602. Under the circumstances, as shown in the first stage (i) of FIGS. 20A through 20C, the U-phase coil 601 and the V-phase coil 602 are opposite to the south pole S in the permanent magnet 315 while the W-phase coil 603 is opposite to the north pole N in the permanent magnet 315. Thereafter, the rotor 310 rotates in the direction depicted at the arrow E to put the DD motor 300 into the first state (i) illustrated in FIG. 18. In this event, the U-phase coil 601 is placed in such a location that the permanent magnet 315 shifts from the south pole S to the north pole N.

It is necessary for the DD motor 300 to change the state of the electric current I flowing through the three-phase coils 601 to 603 from the first state (i) illustrated in FIGS. 18 and 19 to the second state (ii) illustrated in FIGS. 18 and 19 at the boundary of the shifted location. For this purpose, that the permanent magnet 315 shifts from the south pole S to the north pole N may be detected on the basis of polarity of the "electromotive force" induced in the U-phase coil 601 which is put into the high-impedance state. In addition, when the permanent magnet 315 shifts from the north pole N to the south pole S, polarity of the induced electromotive force becomes reverse polarity.

In the manner which is described above, by exchanging the electric current I to be flowed through the thee-phase coils 601 to 603, as illustrated in the second state (ii) in FIGS. 18 and 19, the W-phase coil 603 is put into the high-impedance state or the "M" state, the U-phase coil 601 is operable as the source coil or is put into the "H" state, and the V-phase coil 602 is operable as the sink coil or is put into the "L" state. That is, the electric current I flows into the U-phase coil 601 through the neutral point NP and flows out of the V-phase coil 602. Under the circumstances, as shown in the second stage (ii) of FIGS. 20A through 20C, the U-phase coil 601 and the W-phase coil 603 are opposite to the north pole N in the permanent magnet 315 while the V-phase coil 602 is opposite to the south pole S in the permanent magnet 315. When the rotor 310 rotates in the direction depicted at the arrow E to put the DD motor 300 into the second state (ii) in FIG. 18, the W-phase coil 603 is placed in such a location that the permanent magnet 315 shifts from the north pole N to the south pole S. By detecting that the permanent magnet 315 shifts from the north pole N to the south pole S on the basis of polarity of the electromotive force induced in the W-phase coil 603 which is put into the high-impedance state, the state of the electric current I to be flowed through the thee-phase coils 601 to 603 is exchanged from the second state (ii) as illustrated in FIGS. 18 and 19 into the third state (iii) as illustrated in FIGS. 18 and 19.

Thereafter, similar operation is carried out. In particular, in the third state (iii) where the electric current I flows into the U-phase coil 601 through the neutral point NP and flows out of the W-phase coil 603, by detecting that the permanent magnet 315 opposed to the V-phase coil 602 shifts from the south pole S to the north pole N on the basis of polarity of the electromotive force induced in the V-phase coil 602 put into the high-impedance state, the state of the electric current I to be flowed through the thee-phase coils 601 to 603 is exchanged from the third state (iii) as illustrated in FIGS. 18 and 19 into the fourth state (iv) as illustrated in FIGS. 18 and 19. Likewise, in the fourth state (iv) where the electric current I flows into the V-phase coil 602 through the neutral point NP and flows out of the W-phase coil 603, by detecting that the permanent magnet 315 opposed to the U-phase coil 601 shifts from the north pole N to the south S on the basis of polarity of the electromotive force induced in the U-phase coil 601 put into the high-impedance state, the state of the electric current I to be flowed through the thee-phase coils 601 to 603 is exchanged from the fourth state (iv) as illustrated in FIGS. 18 and 19 into the fifth state (v) as illustrated in FIGS. 18 and 19.

Subsequently, in the fifth state (v) where the electric current I flows into the V-phase coil 602 through the neutral point NP and flows out of the U-phase coil 601, by detecting that the permanent magnet 315 opposed to the W-phase coil 603 shifts from the south pole S to the north pole N on the basis of polarity of the electromotive force induced in the W-phase coil 603 put into the high-impedance state, the state of the electric current I to be flowed through the thee-phase coils 601 to 603 is exchanged from the fifth state (v) as illustrated in FIGS. 18 and 19 into the sixth state (vi) as illustrated in FIGS. 18 and 19. Finally, in the sixth state (vi) where the electric current I flows into the W-phase coil 603 through the neutral point NP and flows out of the U-phase coil 601, by detecting that the permanent magnet 315 opposed to the V-phase coil 602 shifts from the north pole N to the south S on the basis of polarity of the electromotive force induced in the V-phase coil 602 put into the high-impedance state, the state of the electric current I to be flowed through the thee-phase coils 601 to 603 is exchanged from the sixth state (vi) as illustrated in FIGS. 18 and 19 into the first state (i) as illustrated in FIGS. 18 and 19. Thereafter, similar operation may be repeated.

On summarizing the above-mentioned operation, output states for the three-phase coils 601 to 603 are switched as a following table 2 on the basis of polarity of the electromotive force induced in one of the three-phase coils 601 to 603 that is put into the high-impedance.

TABLE 2

|       | M state  | detection | U-phase coil | V-phase coil | W-phase coil |
|-------|----------|-----------|--------------|--------------|--------------|
| (i)   | U-phase  | S –> N    | M            | L            | H            |
| (ii)  | W-phase  | N –> S    | H            | L            | M            |
| (iii) | V-phase  | S –> N    | H            | M            | L            |
| (iv)  | U-phase  | N –> S    | M            | H            | L            |
| (v)   | W-phase  | S –> N    | L            | H            | M            |
| (vi)  | V-phase  | N –> S    | L            | M            | H            |

For instance, it will be assumed that the U-phase coil 601 is put into the high-impedance state as shown in the first state (i) of the above-mentioned table 2. In this event, when that the permanent magnet 315 opposed to the U-phase coil 601 shifts from the south pole S to the north pole N is detected on the basis of polarity of the electromotive force induced in the U-phase coil 601, the output state of the three-phase coils 601 to 603 is switched into the second state (ii) in the table 2.

In other words, responsive to the above-mentioned input conditions, a spindle motor IC chip (which corresponds to the spindle motor IC chip 60' illustrated in FIG. 11 except that terminals for the three Hall elements 606 to 606 are omitted) determines the source and the sink coils in the three-phase coils 601 to 603 as illustrated in a following table 3.

TABLE 3

| | detection phase for EMF | detection | source coil | sink coil |
|---|---|---|---|---|
| (i) | U-phase | S -> N | W-phase | V-phase |
| (ii) | W-phase | N -> S | U-phase | V-phase |
| (iii) | V-phase | S -> N | U-phase | W-phase |
| (iv) | U-phase | N -> S | V-phase | W-phase |
| (v) | W-phase | S -> N | V-phase | U-phase |
| (vi) | V-phase | N -> S | W-phase | U-phase |

That is, the spindle motor IC chip determines the source and the sink coils in the three-phase coils 601 to 603 by detecting polarity of the electromotive force or EMF induced in one of the three-phase coils 601 to 603 that is put into the high-impedance state.

Figure 21:
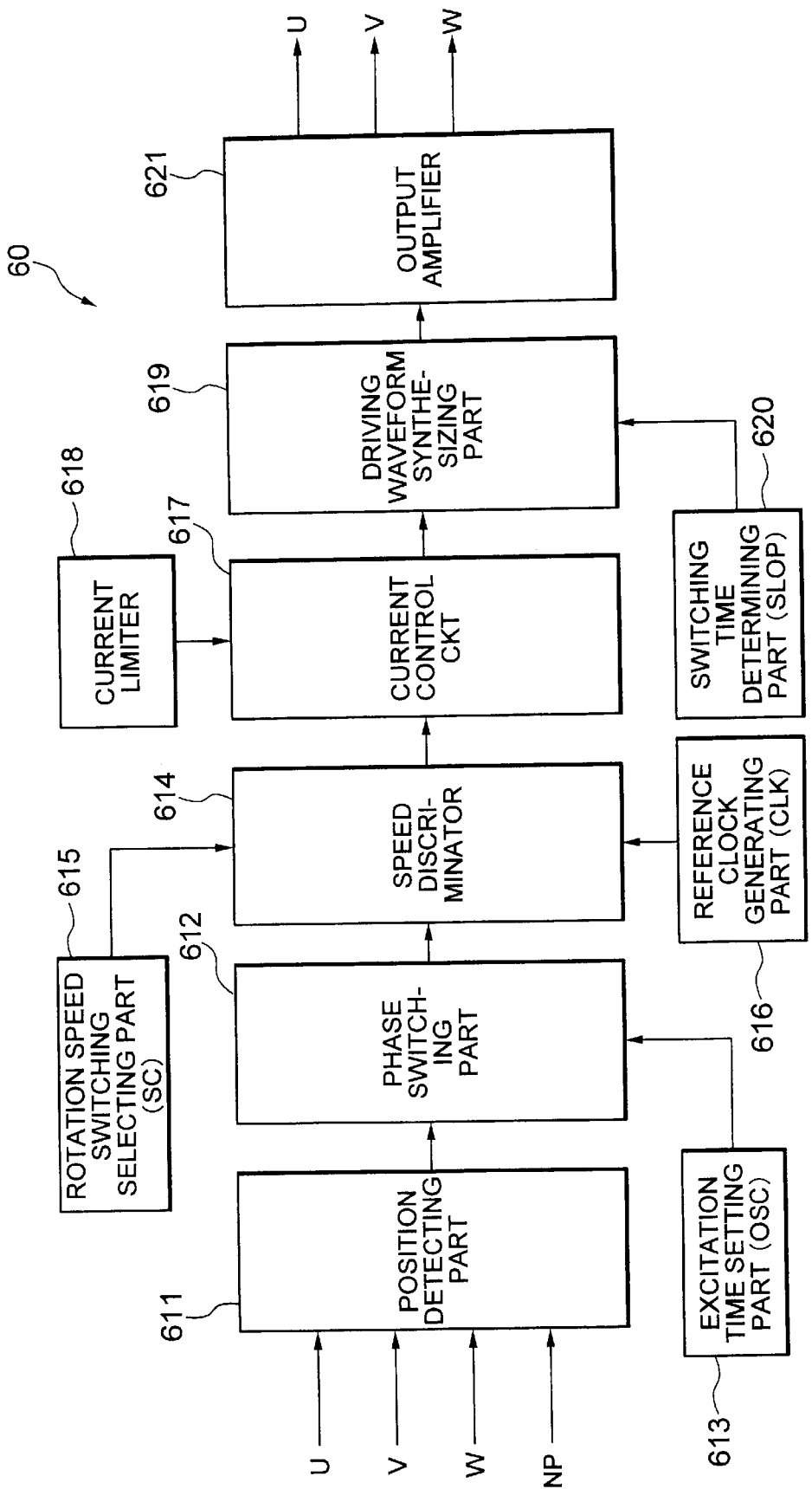
FIG. 21 is a block diagram for showing an internal structure of a main portion of a DD motor IC chip for realizing a motor rotation control method in a floppy disk drive according to an embodiment of this invention.

Referring to FIG. 21, the description will proceed to a DD motor IC chip 60 for realizing the motor rotation control method according to this invention. FIG. 21 illustrates an internal structure of a main portion of the DD motor IC chip 60. The DD motor IC chip 60 has a U-phase output terminal U connected to the U-phase coil 601, a V-phase output terminal V connected to the V-phase coil 602, a W-phase output terminal W connected to the W-phase coil 603, and a neutral terminal NP connected to the neutral point NP.

On the other hand, the DD motor IC chip 60 comprises a position detecting part 611, a phase switching part 612, an excitation time setting part (OSC) 613 for setting an excitation time interval for the coils, a speed discriminator 614, a rotation speed switching selecting part (SC) 615 for switching between 300 PPM and 360 RPM, a reference clock generating part (CLK) 616 for generating a reference clock signal, a current control circuit 617, a current limiter 618, a driving waveform synthesizing part 619, a switching time determining part (SLOP) 620 for determining a motor excitation switching time interval for the coils, and an output amplifier 621.

The position detecting part 611 is connected to the U-phase output terminal U, the V-phase output terminal V, the W-phase output terminal W, and the neutral terminal NP. Specifically, the position detecting part 611 serves as a detecting arrangement for detecting an electromotive force (counterelectromotive force) induced in one of the three-phase coils 601 to 603 that is put into the high-impedance state. The position detecting part 611 produces a position detected signal indicative of the counterelectromotive force. The position detected signal is supplied to the phase switching part 612. The excitation time setting part 613 sets the excitation time interval for the coils and supplies a signal indicative of a set time interval to the phase switching part 612. The phase switching part 612 compares the set time interval set by the excitation time setting part 613 with the counterelectromotive force detected by the position detecting part 611, selects an earlier one for timing, and produces a phase switching signal for phase switching. The phase switching signal acts as the above-mentioned servo signal. That is, the phase switching part 612 generates the servo signal which is a signal having 30 cycles per one rotation of the DD motor 300.

At any rate, a combination of the position detecting part 611, the excitation time setting part 613, and the phase switching part 612 serves as an electronic processing arrangement for electronically processing the counterelectromotive force (electromotive force) generated from the stator coils 322 (the U-phase coil 601, the V-phase coil 602, and the W-phase coil 603) to generate the servo signal.

The phase switching signal (servo signal) is supplied to the speed discriminator 614. In addition, the speed discriminator 614 is supplied with a rotation speed instruction signal indicative of the rotation speed from the rotation speed switching selecting part 615 and is supplied with the reference clock signal having a reference clock frequency of 1 MHz from the reference clock generating part 616. The speed discriminator 616 comprises a counter (frequency divider) (not shown) in which a count number (dividing ratio) is set in accordance with the rotation speed instruction signal. More specifically, for instance, it will be assumed that the rotation speed instruction signal indicates 300 RPM. In this event, the counter frequency divides the reference clock signal to generate a divided clock signal having a divided clock frequency of 150 Hz. The speed discriminator 616 further comprises a comparator (not shown) for comparing the divided clock signal (divided clock frequency) with the serve signal (servo frequency) to produce a comparison result. On the basis of the comparison result, the speed discriminator 614 supplies the current control circuit 617 with a current instruction signal for instructing that an electric current is increased or decreased. Responsive to the current instruction signal, the current control circuit 617 controls the electric current for flowing through the three-phase coils 601 to 603.

For instance, it will be assumed that the serve frequency is lower than the divided clock frequency. In this event, the speed discriminator 614 generates the current instruction signal for instructing that the electric current is increased. Responsive to the current instruction signal, the current control circuit 617 controls the electric current so as to increase the electric current flowing through the three-phase coils 601 to 603. On the contrary, it will be presumed that servo frequency is higher than the divided clock frequency. Under the circumstances, the speed discriminator 614 generates the current instruction signal for instructing that the electric current is decreased. Responsive to the current instruction signal, the current control circuit 617 controls the electric current so as to decrease the electric current flowing through the three-phase coils 601 to 603. In addition, in the current control circuit 617, a maximum electric current flowing through the three-phase coils 601 to 603 is limited by the current limiter 618.

Determined by the current control circuit 617, the electric current is supplied to the driving waveform synthesizing part 619. The driving waveform synthesizing part 619 is supplied with a switching time determination signal from the switching time determining part 620. On the basis of the motor excitation switching time interval indicated by the switching time determination signal, the driving waveform synthesizing part 619 synthesizes a driving waveform to produce a driving waveform synthesized signal. The driving waveform synthesized signal is supplied to the output amplifier 612. The output amplifier 612 amplifies the driving waveform synthesized signal to supply an amplified signal to the three-phase coils 601 to 603.

At any rate, a combination of the speed discriminator 614, the rotation speed switching selecting part 615, the reference clock generating part 616, the current control circuit 617, the current limiter 618, the driving waveform synthesizing part 619, the switching time determining part 620, and the output amplifier 621 serves as a control arrangement for controlling the rotation speed of the DD motor 300 on the basis of the servo signal.

In the manner as described above, inasmuch as the DD motor IC chip 60 according to this invention obtains the servo signal for controlling the rotation speed of the DD motor 300 by detecting the electromotive force induced in one of the three-phase coils 601 to 603 that is put into the high-impedance state, the frequency generation pattern FGPT required in prior art is not necessary and it is therefore possible to decrease the number of parts.

While this invention has thus far been described in conjunction with a preferred embodiment thereof, it is to be understood that modifications will be apparent to those skilled in the art without departing from the spirit of the invention. For example, although description has been made in the above-mentioned embodiment by exemplifying a case applied to the direct-drive motor having the ratio M:N of 4:3 where M represents the number of the main magnetized elements in the rotor 310 and N represent the number of the poles in the stator 320, the above-mentioned ratio M:N is certainly not restricted to this.

What is claimed is:

1. A floppy disk drive comprising:

a main frame in which a floppy disk is inserted;

a motor for rotatably driving the floppy disk inserted in the main frame;

a motor frame on which the motor is mounted and that is integrally formed with the main frame; and an electronic processing arrangement for effecting a function equivalent to a frequency generation pattern required to control the motor;

wherein the electronic processing arrangement obtains a servo signal for controlling a rotation speed of the motor by detecting an electromotive force induced in one of three-phase coils of the motor that is put into a high-impedance state.

2. The floppy disk drive as claimed in claim 1, wherein the motor frame part has a drawn-shape obtained by drawing said main frame.

\* \* \* \* \*